United States Patent [19]
Bobo, II

[11] Patent Number: 5,870,549
[45] Date of Patent: *Feb. 9, 1999

[54] SYSTEMS AND METHODS FOR STORING, DELIVERING, AND MANAGING MESSAGES

[76] Inventor: Charles R. Bobo, II, 569 Elmwood Dr., NE., Atlanta, Ga. 30306

[*] Notice: The term of this patent shall not extend beyond the expiration date of Pat. No. 5,675,507.

[21] Appl. No.: 944,741

[22] Filed: Oct. 6, 1997

Related U.S. Application Data

[63] Continuation-in-part of Ser. No. 431,716, Apr. 28, 1995, Pat. No. 5,675,507.

[51] Int. Cl.$^6$ .................................................. H04N 1/413
[52] U.S. Cl. ....................... 395/200.36; 348/14; 348/17; 358/400; 358/402
[58] Field of Search .............................. 395/200.36, 154; 348/17, 14; 358/400, 402, 403; 340/311.1

[56] References Cited

U.S. PATENT DOCUMENTS

| | | |
|---|---|---|
| 4,106,060 | 8/1978 | Chapman, Jr. . |
| 4,918,722 | 4/1990 | Duehren et al. . |
| 5,033,079 | 7/1991 | Catron et al. . |
| 5,065,427 | 11/1991 | Godbole . |
| 5,068,888 | 11/1991 | Scherk et al. . |
| 5,091,790 | 2/1992 | Silverberg . |
| 5,115,326 | 5/1992 | Burgess et al. . |
| 5,175,762 | 12/1992 | Kochis et al. . |
| 5,247,591 | 9/1993 | Baran . |
| 5,255,312 | 10/1993 | Koshiishi . |
| 5,257,112 | 10/1993 | Okada . |
| 5,291,302 | 3/1994 | Gordon et al. . |
| 5,291,546 | 3/1994 | Giler et al. . |
| 5,317,628 | 5/1994 | Misholi et al. . |
| 5,333,266 | 7/1994 | Boaz et al. . |
| 5,349,636 | 9/1994 | Irribarren . |
| 5,479,411 | 12/1995 | Klein . |
| 5,483,580 | 1/1996 | Brandman et al. . |
| 5,497,373 | 3/1996 | Hulen et al. . |
| 5,526,353 | 6/1996 | Henley et al. . |
| 5,608,786 | 3/1997 | Gordon . |
| 5,675,507 | 10/1997 | Bobo, II . |

FOREIGN PATENT DOCUMENTS

WO 96/34341  10/1996  WIPO .

OTHER PUBLICATIONS

Delrina Advertisement, 1994.
"Working with . . . Fax Mailbox" PCToday by Jim Cope (Sep. 1994, vol. 8, Issue 9).
Voice/Fax Combos by Stuart Warren, *Computer Telephony*, Sep./Oct. 1994, p. 88.

*Primary Examiner*—Thomas Peeso
*Attorney, Agent, or Firm*—Geoff L. Sutcliffe; Kilpatrick Stockton LLP

[57] ABSTRACT

A Message Storage and Deliver System (MSDS) is connected to the public switched telephone network (PSTN) and receives incoming calls with these calls being facsimile, voice, or data transmissions. The MSDS detects the type of call and stores the message signal in a database. The MSDS is also connected to the Internet and has a hyper-text transfer protocol deamon (HTTPD) for receiving requests from users. The HTTPD forwards requests for certain files or messages to a network server which transmits at least part of the message to the HTTPD and then to the user. In addition to requests for certain documents, the HTTPD may also receive a request in the form of a search query. The search query is forwarded from the HTTPD to an application program for conducting the search of the database. The results of the search are forwarded through the HTTPD to the user. The user may then select one or more files or messages from the search results and may save the search for later reference.

4 Claims, 18 Drawing Sheets

SEARCH QUERY

RECIPIENT'S NAME: [          ] ↓

DOCUMENT TYPE: [          ] ↓

DATE: [          ]

TIME: [          ]

CALLING NO.: [          ]

FILE SIZE: [          ]

NO. PAGES: [          ]

DOCUMENT NO.: [          ]

OTHER FIELD: [          ] ↓

SEARCH                RECENT FILES

STORED
SEARCH GROUP          HELP

FIG. 19

SEARCH QUERY

RECIPIENT'S NAME: [          ]

DOCUMENT TYPE: [FACSIMILE]

DATE: [          ]

TIME: [          ]

CALLING NO.: [(404) 249-6801]

FILE SIZE: [          ]

NO. PAGES: [          ]

DOCUMENT NO.: [          ]

OTHER FIELD: [          ]

SEARCH          RECENT FILES

STORED SEARCHES          HELP

SEARCH RESULTS

1. Document No. 11: Facsimile from (404) 249-6801 to Jane Doe on May 31, 1995, 3 Pages 2. Document No. 243: Facsimile from (404) 249-6801 to Jane Doe on July 16, 1995, 21 Pages 3. Document No. 1002: Facsimile from (404) 249-6801 to Jane Doe on January 1, 1996, 10 Pages

SAVE SEARCH AS:  CHARLES R. BOBO FACSIMILES

HELP

FIG. 21

STORED SEARCHES

1. CHARLES R. BOBO FACSIMILES

2. CHARLES R. BOBO VOICE MESSAGES

3. DATA TRANSFERS FROM 01-01-96 TO 6-01-96 TO JANE DOE

HELP

FIG. 22

SYSTEMS AND METHODS FOR STORING, DELIVERING, AND MANAGING MESSAGES

This application is a continuation-in-part of patent application Ser. No. 08/431,716, filed Apr. 28, 1995, now U.S. Pat. No. 5,675,507.

FIELD OF THE INVENTION

This invention relates to system(s) and method(s) for storing and delivering messages and, more particularly, to system(s) and method(s) for storing messages and for delivery the messages through a network, such as the Internet, or a telephone line to an intended recipient. In another aspect, the invention relates to system(s) and method(s) for storing, delivering, and managing messages or other files, such as for archival purposes or for document tracking.

BACKGROUND OF THE INVENTION

Even though the facsimile machine is heavily relied upon by businesses of all sizes and is quickly becoming a standard piece of office equipment, many businesses or households cannot receive the benefits of the facsimile machine. Unfortunately, for a small business or for a private household, a facsimile machine is a rather expensive piece of equipment. In addition to the cost of purchasing the facsimile machine, the facsimile machine also requires toner, paper, maintenance, as well as possible repairs. These expenses may be large enough to prevent many of the small businesses and certainly many households from benefiting from the service that the facsimile machine can provide. For others who are constantly traveling and who do not have an office, it may be impractical to own a facsimile machine. In fact, the Atlanta Business Chronicle estimates that 30% of the small businesses do not have any facsimile machines. Therefore, many businesses and households are at a disadvantage since they do not have access to a facsimile machine.

Because a facsimile machine can be such an asset to a company and is heavily relied upon to quickly transmit and receive documents, a problem exists in that the machines are not always available to receive a facsimile message. At times, a facsimile machine may be busy receiving another message or the machine may be transmitting a message of its own. During these times, a person must periodically attempt to send the message until communication is established with the desired facsimile machine. This inability to connect with a facsimile machine can be frustrating, can consume quite a bit of the person's time, and prevent the person from performing more productive tasks. While some more advanced facsimile machines will retry to establish communication a number of times, a person will still have to check on the facsimile machine to ensure that the message was transmitted or to re-initiate the transmission of the message.

In addition to labor costs and a reduction in office efficiency, a facsimile machine may present costs to businesses that are not readily calculated. These costs include the loss of business or the loss of goodwill that occurs when the facsimile machine is not accessible by another facsimile machine. These costs can occur for various reasons, such as when the facsimile machine is out of paper, when the machine needs repairing, or when the facsimile machine is busy with another message. These costs occur more frequently with some of the smaller businesses, who are also less able to incur these expenses, since many of them have a single phone line for a telephone handset and the facsimile machine and thereby stand to lose both telephone calls and facsimile messages when the single line is busy. In fact, the Atlanta Business Chronicle estimated that fewer than 5% of the small businesses have 2 or more facsimile machines. Many of the larger companies can reduce these losses by having more than one facsimile machine and by having calls switched to another machine when one of the machines is busy. These losses, however, cannot be completely eliminated since the machines can still experience a demand which exceeds their capabilities.

A main benefit of the facsimile machine, namely the quick transfer of documents, does not necessarily mean that the documents will quickly be routed to the intended recipient. The facsimile machines may be unattended and a received facsimile message may not be noticed until a relatively long period of time has elapsed. Further, even for those machines which are under constant supervision, the routing procedures established in an office may delay the delivery of the documents. It is therefore a problem in many offices to quickly route the facsimile message to the intended recipient.

The nature of the facsimile message also renders it difficult for the intended recipient to receive a sensitive message without having the message exposed to others in the office who can intercept and read the message. If the intended recipient is unaware that the message is being sent, other people may see the message while it is being delivered or while the message remains next to the machine. When the intended recipient is given notice that a sensitive message is being transmitted, the intended recipient must wait near the facsimile machine until the message is received. It was therefore difficult to maintain the contents of a facsimile message confidential.

In an office with a large number of employees, it may also be difficult to simply determine where the facsimile message should be routed. In light of this difficulty, some systems have been developed to automatically route facsimile messages to their intended recipient. One type of system, such as the one disclosed in U.S. Pat. No. 5,257,112 to Okada, can route an incoming call to a particular facsimile machine based upon codes entered with telephone push-buttons by the sender of the message. Another type of system, such as the one disclosed in U.S. Pat. No. 5,115,326 to Burgess et al. or in U.S. Pat. No. 5,247,591 to Baran, requires the sender to use a specially formatted cover page which is read by the system. This type of system, however, burdens the sender, who may very well be a client or customer, by requiring the sender to take special steps or additional steps to transmit a facsimile message. These systems are therefore not very effective or desirable.

Another type of routing system links a facsimile machine to a Local Area Network (LAN) in an office. For instance, in the systems disclosed in the patents to Baran and Burgess et al., after the system reads the cover sheet to determine the intended recipient of the facsimile message, the systems send an E-mail message to the recipient through the local network connecting the facsimile machine to the recipient's computer. Other office systems, such as those in U.S. Pat. No. 5,091,790 to Silverberg and U.S. Pat. No. 5,291,546 to Giler et al., are linked to the office's voice mail system and may leave a message with the intended recipient that a facsimile message has been received. Some systems which are even more advanced, such as those in U.S. Pat. No. 5,317,628 to Misholi et al. and U.S. Pat. No. 5,333,266 to Boaz et al., are connected to an office's local network and provide integrated control of voice messages, E-mail messages, and facsimile messages.

The various systems for routing facsimile messages, and possibly messages of other types received in the office, are very sophisticated and expensive systems. While these office systems are desirable in that they can effectively route the messages at the office to their intended recipients, the systems are extremely expensive and only those companies with a great number of employees can offset the costs of the system with the benefits that the system will provide to their company. Thus, for most businesses, it still remains a problem to effectively and quickly route messages to the intended recipients. It also remains a problem for most businesses to route the messages in a manner which can preserve the confidential nature of the messages.

Even for the businesses that have a message routing system and especially for those that do not have any type of system, it is usually difficult for a person to retrieve facsimile messages while away from the office. Typically, a person away on business must call into the office and be informed by someone in the office as to the facsimile messages that have been received. Consequently, the person must call into the office during normal business hours while someone is in the office and is therefore limited in the time that the information in a facsimile message can be relayed.

If the person away on business wants to look at the facsimile message, someone at the office must resend the message to a facsimile machine accessible to that person. Since this accessible machine is often a facsimile machine at another business or at a hotel where the person is lodging, it is difficult for the person to receive the facsimile message without risking disclosure of its contents. Further, since someone at the person's office must remember to send the message and since someone at the accessible facsimile machine must route the message to the person away from the office, the person may not receive all of the facsimile messages or may have to wait to receive the messages.

The retrieval of facsimile messages, as well as voice mail messages, while away from the office is not without certain costs. For one, the person often must incur long distance telephone charges when the person calls the office to check on the messages and to have someone in the office send the messages to another facsimile. The person will then incur the expenses of transmitting the message to a fax bureau or hotel desk as well as the receiving location's own charges for use of their equipment. While these charges are certainly not substantial, the charges are nonetheless expenses incurred while the person is away from the office.

Overall, while the facsimile machine is an indispensable piece of equipment for many businesses, the facsimile machine presents a number of problems or costs. Many businesses or households are disadvantaged since they are unable to reap the benefits of the facsimile machine. For the businesses that do have facsimile machines, the businesses must incur the normal costs of operating the facsimile machine in addition to the costs that may be incurred when the facsimile machine or machines are unable to receive a message. Further, the facsimile messages may not be efficiently or reliably routed to the intended recipient and may have its contents revealed during the routing process. The costs and problems in routing a facsimile message are compounded when the intended recipient is away from the office.

Many of the problems associated with facsimile messages are not unique to just facsimile messages but are also associated with voice mail messages and data messages. With regard to voice messages, many businesses do not have voice mail systems and must write the message down. Thus, the person away from the office must call in during normal office hours to discover who has called. The information in these messages are usually limited to just the person who called, their number, and perhaps some indication as to the nature of the call. For those businesses that have voice mail, the person away from the office must call in and frequently incur long distance charges. Thus, there is a need for a system for storing and delivery voice messages which can be easily and inexpensively accessed at any time.

With regard to data messages, the transmission of the message often requires some coordination between the sender and the recipient. For instance, the recipient's computer must be turned on to receive the message, which usually occurs only when someone is present during normal office hours. Consequently, the recipient's computer is usually only able to receive a data message during normal office hours. Many households and also businesses may not have a dedicated data line and must switch the line between the phone, computer, and facsimile. In such a situation, the sender must call and inform the recipient to switch the line over to the computer and might have to wait until the sender can receive the message. The retransmission of the data message to another location, such as when someone is away from the office, only further complicates the delivery. It is therefore frequently difficult to transmit and receive data messages and is also difficult to later relay the messages to another location.

A standard business practice of many companies is to maintain records of all correspondence between itself and other entities. Traditionally, the correspondence that has been tracked and recorded includes letters or other such printed materials that is mailed to or from a company to the other entity. Although tracking correspondence of printed materials is relatively easy, non-traditional correspondence, such as facsimile messages, e-mail messages, voice messages, or data messages, are more difficult to track and record.

For example, facsimile messages may be difficult to track and record since the messages may be received on thermal paper, which suffers from a disadvantage that the printing fades over time. Also, accurate tracking of facsimile messages is difficult since the facsimile messages may only be partially printed at the facsimile machine or the messages may be lost or only partially delivered to their intended recipients. Facsimile messages also present difficulties since they are often delivered within an organization through different channels than ordinary mail and thus easily fall outside the normal record keeping procedures of the company.

Voice mail messages are also difficult to track and record. Although voice messages can be saved, many voice mail servers automatically delete the messages after a certain period of time. To maintain a permanent record of a voice message, the voice message may be transcribed and a printed copy of the message may be kept in the records. This transcribed copy of the voice message, however, is less credible and thus less desirable than the original voice message since the transcribed copy may have altered material or may omit certain portions of the message.

In addition to facsimile and voice mail messages, data messages are also difficult to track and record. A download or upload of a file may only be evident by the existence of a file itself. A file transfer procedure normally does not lend itself to any permanent record of what file was transferred, the dialed telephone number, the telephone number of the computer receiving the file, the time, or the date of the transfer. It is therefore difficult to maintain accurate records of all data transfers between itself and another entity.

SUMMARY OF THE INVENTION

It is an object of the invention to reliably and efficiently route messages to an intended recipient.

It is another object of the invention to route messages to the intended recipient while maintaining the contents of the message confidential.

It is another object of the invention to enable the intended recipient to access the messages easily and with minimal costs.

It is a further object of the invention to permit the simultaneous receipt of more than one message on behalf of the intended recipient.

It is a further object of the invention to enable the intended recipient of a message to access the message at any time and at virtually any location world-wide.

It is yet a further object of the invention to enable the intended recipient of a message to browse through the received messages.

It is yet a further object of the invention to quickly notify an intended recipient that a message has been received.

It is still another object of the invention to receive messages of various types.

It is still another object of the invention to deliver messages according to the preferences of the intended recipient.

It is still a further object of the invention to record and track correspondence, such as facsimile messages, voice mail messages, and data transfers.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, a system and method for storing and delivering messages involves receiving an incoming call and detecting an address signal associated with the incoming call, the address signal being associated with a user of the message storage and delivery system. A message accompanied with the address signal is then received and converted from a first file format to a second file format. The message is stored in the second file format within a storage area and is retrieved after a request has been received from the user. At least a portion of the message is then transmitted to the user over a network with the second file format being a mixed media page layout language.

In another aspect, a network message storage and delivery system comprises a central processor for receiving an incoming call, for detecting an address signal on the incoming call, for detecting a message on the incoming call, and for placing the message in a storage area. The address signal on the incoming call is associated with a user of the network message storage and delivery system. A network server receives the message from the storage area, converts the message into a mixed media page layout language, and places the message in the storage area. When the network server receives a request from the user over the network, the network server transmits at least a portion of the message over the network to the user.

Preferably, the network storage and delivery system can receive facsimile messages, data messages, or voice messages and the network is the Internet. The messages are converted into a standard generalized mark-up language and the user is notified that a message has arrived through E-mail or through a paging system. A listing of the facsimile messages may be sent to the user in one of several formats. These formats include a textual only listing or a listing along with a full or reduced size image of the first page of each message. A full or reduced size image of each page of a message in the listing may alternatively be presented to the user.

According to a further aspect, the invention relates to a system and method for managing files or messages and involves storing message signals in storage and receiving requests from a user for a search. The search preferably comprises a search query that is completed by a user and supplied to a hyper-text transfer protocol deamon (HTTPD) in the system. The HTTPD transfers the request through a common gateway interface (CGI) to an application program which conducts the search. The results of the search are preferably returned through the HTTPD to the computer in the form of a listing of all messages or files satisfying the search parameters. The user may then select one or more of the listed messages or files and may save the search for later references.

BRIEF DESCRIPTION OF THE DRAWINGS

The accompanying drawings, which are incorporated in, and form a part of, the specification, illustrate an embodiment of the present invention and, together with the description, serve to explain the principles of the invention. In the drawings:

FIG. 19 is an example of a search query form for defining a desired search;

FIG. 21 is an example of a set of search results returned to the computer in response to the search query of FIG. 20; and FIG. 22 is an example of a listing of stored searches.

DETAILED DESCRIPTION OF THE PREFERRED EMBODIMENTS

Reference will now be made in detail to the preferred embodiments of the invention, examples of which are illustrated in the accompanying drawings.

Figure 1:
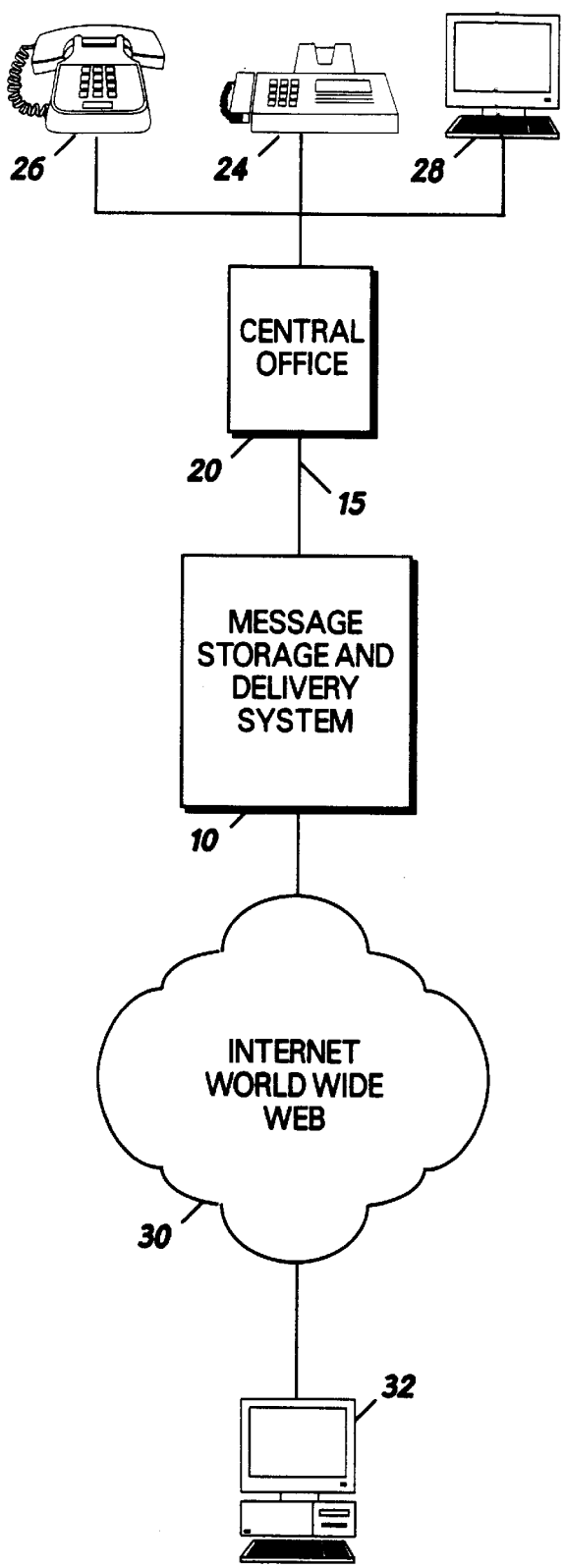
FIG. 1 is a block diagram illustrating the connections of a message storage and delivery system MSDS.

With reference to FIG. 1, a message storage and delivery system (MSDS) 10 is connected to a central office 20 of the telephone company through at least one direct inward dialing (DID) trunk 15. With each call on the DID trunk 15, an address signal indicating the telephone number being called is provided to the MSDS 10. The DID trunk 15 can carry a large number of telephone numbers or addresses. Preferably, the DID trunk 15 comprises a number of DID trunks 15 connected in parallel between the central office 20 and the MSDS 10 so that the MSDS 10 can simultaneously receive more than one call and, moreover, can simultaneously receive more than one call for a single telephone number or address.

The central office 20 is connected to a number of third parties. For instance, the central office 20 may be connected to a facsimile machine 24, a telephone set 26, and to a computer 28 with each connection being made through a separate telephone line. While a single computer 28 is shown in the figure, the single computer 28 may actually represent a local area network which is connected through the central office 20 to the MSDS 10. Although the facsimile machine 24, telephone set 26, and computer 28 have been shown on separate lines, it should be understood that one or more of these devices could share a single line.

The MSDS 10 is also connected to a network, preferably the Internet World Wide Web 30. Although the Internet 30 has been shown as a single entity, it should be understood that the Internet 30 is actually a conglomeration of computer networks and is a constantly evolving and changing structure. The MSDS 10 therefore is not limited to the current structure or form of the Internet 30 but encompasses any future changes or additions to the Internet 30. Further, the MSDS 10 is shown as being directly connected to the Internet 30, such as through its own node or portal. The MSDS 10, however, may be practiced with any suitable connection to the Internet 30, such as through an intermediate Internet access provider.

Figure 2:
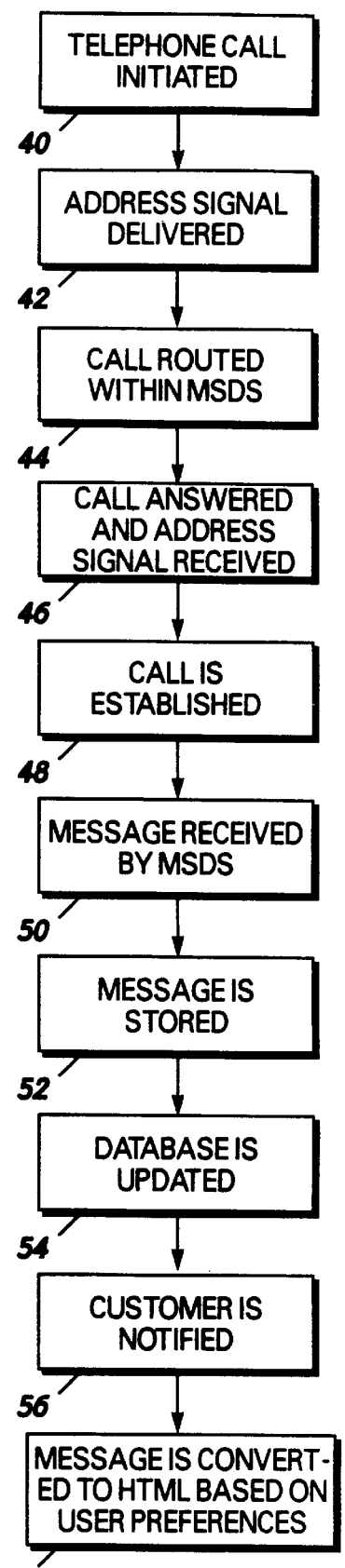
FIG. 2 is an overall flow chart of operations for transmitting a message to the MSDS of FIG. 1.

With reference to FIG. 2 depicting an overall operation of the invention, a telephone call directed to a number serviced by the MSDS 10 is initiated at step 40 by a third party, for instance, through the facsimile machine 24, telephone set 26, or computer 28. The incoming telephone call may therefore carry a facsimile message, a voice message, or a data message. At step 42, the address signal associated with the initiated call is routed through the central office 20, over the DID trunk 15, and to the MSDS 10.

When the call reaches the MSDS 10, the call is routed within the MSDS 10 in a manner that will be described in more detail below with reference to FIG. 13. At step 46, the MSDS 10 answers the telephone call and receives the address signal from the DID trunk 15. Next, at step 48, the call is established between the MSDS 10 and the third party and, at step 50, the MSDS 10 receives the message transmitted over the telephone line. The message is stored at step 52, a database within the MSDS 10 is updated at step 54, and the intended recipient of the message is notified at step 56. The intended recipient of the message uses the services provided by the MSDS 10 and will hereinafter be referred to as a user. At step 58, the message is converted into hyper-text mark-up language (HTML).

Figure 3:
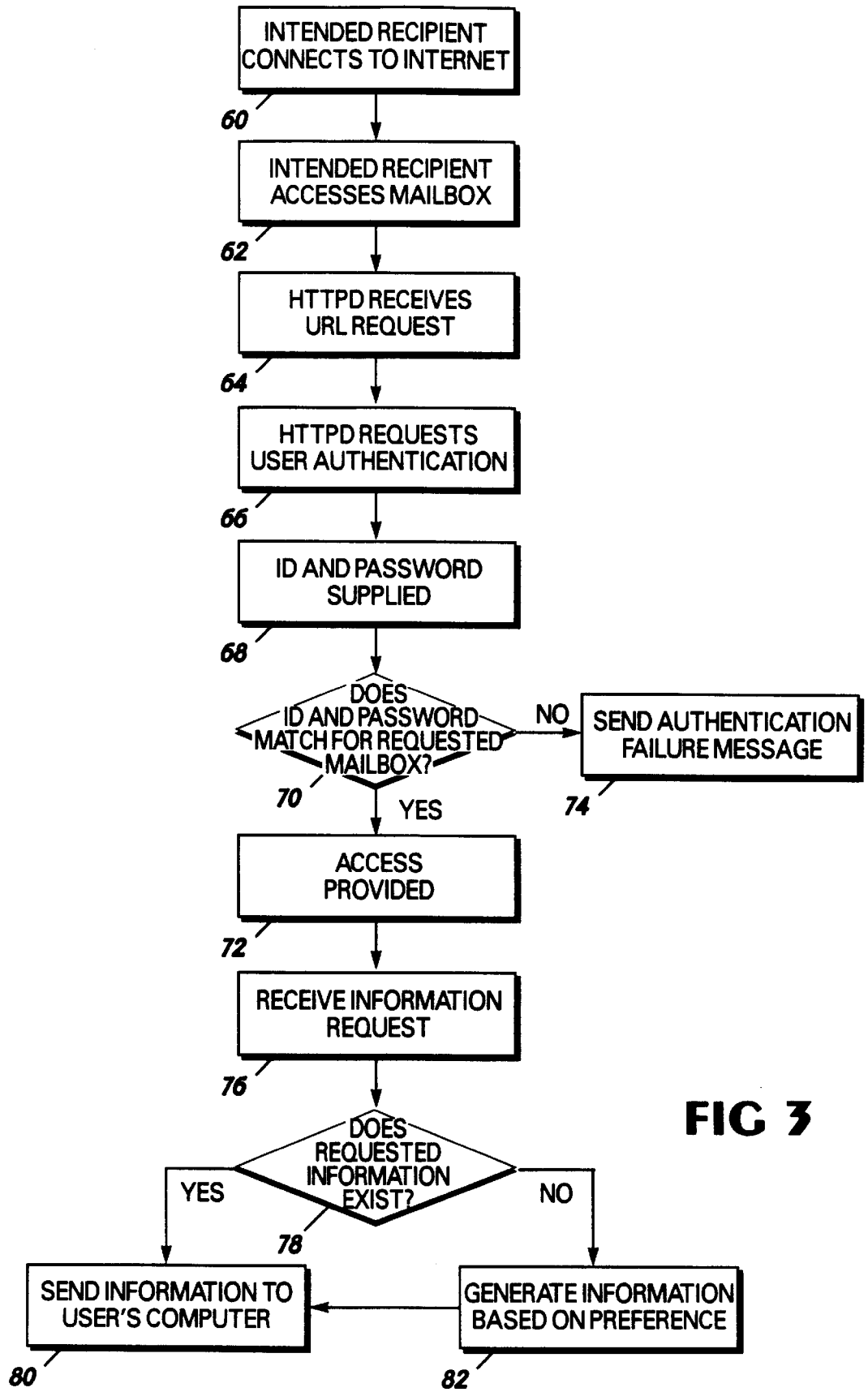
FIG. 3 is an overall flow chart of operations for receiving a message stored at the MSDS of FIG. 1.

After the MSDS 10 receives a message for one of its users, the user can then communicate with the MSDS 10 at any time and at any location by connecting to the Internet World Wide Web 30 and retrieving the message stored within the MSDS 10. With reference to FIG. 3, at step 60 the user first connects to the Internet 30, such as through a personal computer 32 which may be connected to the Internet 30 in any suitable manner, such as through its own portal or node or through some intermediate access provider. The personal computer 32 is not limited to a single computer but may instead comprise a network of computers, such as a local area network within an office.

Once connected with the Internet 30, at step 62, the user accesses with a hyper-text browser the Universal Resource Locator (URL) associated with his or her MSDS 10 mailbox. The computer 32 may use any suitable hypertext browser, such as Netscape, to access the mailbox. A Hypertext Transfer Protocol Deamon (HTTPD) within the MSDS 10 receives the URL request at step 64 and, at step 66, requests user authentication. The user then supplies his or her ID and password at step 68 and, if found valid at step 70, the MSDS 10 provides the computer 32 with access to the mailbox at step 72. If the ID and password are invalid, as determined at step 70, then the HTTPD sends the computer 32 an authentication failure message at step 74.

After the user gains access to the mailbox at step 72, the user can request information stored within the MSDS 10. The MSDS 10 receives the request at step 76 and, at step 78, determines whether the information exists. As is common practice, the MSDS 10 also determines the validity of the request at step 78. The request from the user will include the mailbox number for the user, the message identifier, display preferences, and, if the message is a facsimile message, a page identifier. If for any reason the request is invalid, such as when a hacker is attempting to gain access to privileged information, the request for the information will be terminated.

If the requested information is available, then at step 80 the information is transmitted through the Internet 30 to the user's computer 32. If, on the other hand, the information does not exist, then at step 82 the MSDS 10 will generate the requested information and then send the information to the user's computer through the Internet 30 at step 80.

Prior to gaining access to the mailbox at step 72, the user is preferably sent a greeting page or other such type of information which permits the user to learn about the services provided by the MSDS 10, open an account with the MSDS 10, or gain access to an account. Once access is provided at step 72, the user is provided with information indicating the total number of messages stored in his or her mailbox within the MSDS 10. Preferably, the information sent by the MSDS 10 indicates the total number of messages for each type of message and also the total number of saved messages versus the total number of new messages.

The user is also preferably given the option at this step to change account information. The account information might include the E-mail address for the user, the manner in which messages are to be reviewed, the user's pager information, as well as other user preferences. The display options and other user preferences will be discussed in further detail below.

The general information HTML file which indicates the total number of different messages is provided with a number of anchors, which are also termed links or references. In general, an anchor permits a user on the computer 32 to retrieve information located on another file. For instance, an anchor to a listing of facsimile messages is preferably provided on the display of the total number of messages. When the user selects the anchor for the facsimile list, the MSDS 10 pulls up and displays the file containing the list of facsimiles, such as a file "faxlist.html." The other types of messages, such as voice messages and data messages, would have similar anchors on the general information page directed to their respective HTML listing files.

When a new message is received at step 54 in FIG. 2, the user's mailbox is updated to display the total number and types of messages. The MSDS 10 might also update other files in addition to the total listing of messages. Additionally, at this time, the MSDS 10 sends an E-mail message to the user's computer 32 to inform the user of the newly arrived message. The MSDS 10 could also send notice to the user through a paging system so that the user receives almost instantaneous notice that a message is received.

The MSDS 10 also generates additional information according to the user's preferences. These preferences on how the MSDS 10 is configured for the user include options on how the messages are reviewed. With facsimile messages, for instance, the user can vary the amount or the type of information that will be supplied with the listing of the facsimile messages by selecting an appropriate option. Other options are also available so that the user can custom fit the MSDS 10 to the user's own computer 32 or own personal preferences.

For instance, when a facsimile message is received, the MSDS 10, at step 54, will update the total listing of all messages to indicate the newly received message and may additionally generate the HTML files for the newly received facsimile message according to the user's preferences. When the user later requests information on the message at step 76, the HTML information has already been generated and the MSDS 10 may directly send the requested information to the user at step 80. If, on the other hand, the user desires to view the message according to one of the other options, the MSDS 10 will generate the HTML files at step 82 according to that other option at the time of the request.

A first option available to the user for viewing a facsimile message is a textual only listing of the messages. The information on the textual listing preferably includes the date and time that the message was received at the MSDS 10, the telephone number from where the message was transmitted, the number of pages, the page size, and the size of the message in bytes. The messages, of course, could be listed with other types of information. When the user selects one of the facsimile messages on the list, a request is sent to the HTTPD within the MSDS 10 causing the message to be downloaded via the Internet 30 to the user's computer 32. Once the message is received by the computer 32, the message can be displayed, printed, or saved for further review.

The second through fifth options allow the user to preview an image of the facsimile message before having the message downloaded from the MSDS 10 through the Internet 30 and to the computer 32. The second option permits the user to view the list of messages with a reduced size image of the cover page next to each entry on the list. When the user selects one of the messages on the list, the selected facsimile message is transmitted through the Internet 30 to the computer 32. The user may also scroll through the listings if all of the message cannot be displayed at one time on the computer 32.

The third option provides the user with a full size view of the cover page of each facsimile message. The user can quickly scroll through the cover pages of each message without downloading the entire message to the computer 32. The full size view of the cover pages permit the user to clearly discern any comments that may be placed on the cover page, which may not be possible from just a reduced image of the cover page available through the second option.

The fourth option provides the user with a reduced size image of each page and permits the user to scroll through the entire message. The user can therefore read the entire facsimile message on screen before the message is downloaded onto the computer 32. With this option, the user can go through the pages of the facsimile message and can also skip to the next message or previous message. Additionally, the user has the option of enlarging a page to a full size view of the page. When one of the messages is selected, as with the other options, the HTTPD within the MSDS 10 causes the facsimile message to be transmitted through the Internet 30 to the user's computer 32.

With a fifth option, a full size image of each page is transmitted to the user's computer 32. The user can scroll through the pages of the facsimile message and easily read the contents of each page. If the user wants the message downloaded to the computer 32, the user selects the message and the HTTPD within the MSDS 10 transmits the message to the user's computer 32 through the Internet 30.

Figure 4A:
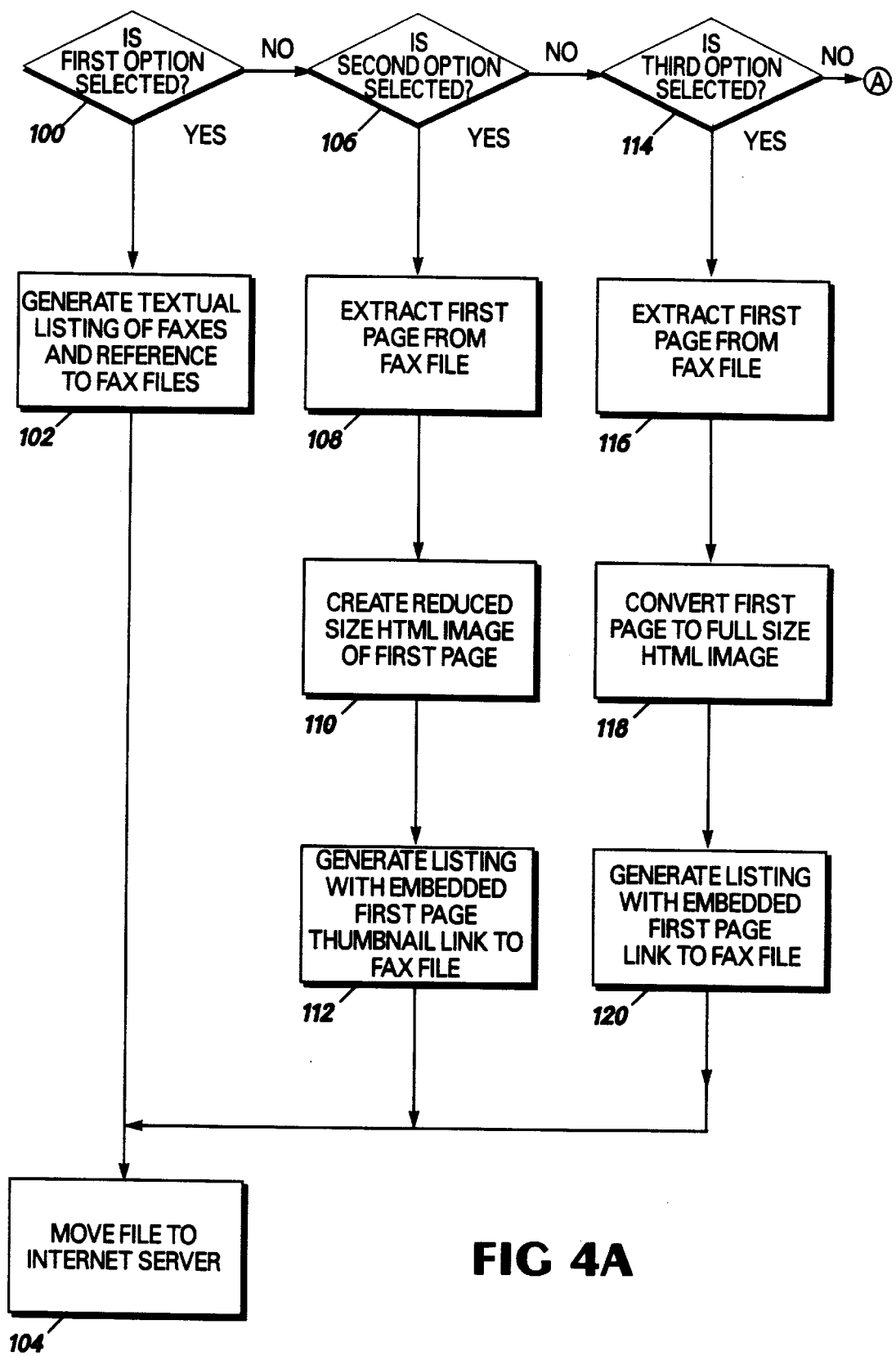
FIGS. 4(A) and (B) are flowcharts of operations for generating HTML files according to user preferences.

As discussed above, after the database is updated at step 54, the MSDS 10 will generate additional information based upon the option selected for displaying the facsimile messages. More specifically, as shown in FIG. 4(A), if the first option has been selected, as determined at step 100, then at step 102 the MSDS 10 will generate the textual listing of the facsimile messages with anchors or references to the respective facsimile files. The HTML files are then moved to an Internet Server at step 104.

If the first option is not selected, the MSDS 10 next determines whether the second option has been selected at step 106. With the second option, the facsimile messages are listed along with a reduced size image of the cover page. To generate this information, the cover page is extracted from the facsimile file at step 108 and a reduced size HTML image of the cover page is created at step 110. At step 112, a listing of the facsimile messages is generated with a thumbnail view of each cover page linked to its respective facsimile file. The generated HTML files are then sent to the Internet Server at step 104.

When the third option is selected, as determined at step 114, a full size image of the cover page is sent to the computer 32. The full size image of the cover page is generated by first extracting the cover page from the facsimile file at step 116. Next, the cover page is converted into a full size HTML image at step 118 and, at step 120, the listing is generated with the embedded cover page linked to the facsimile file.

Figure 4B:
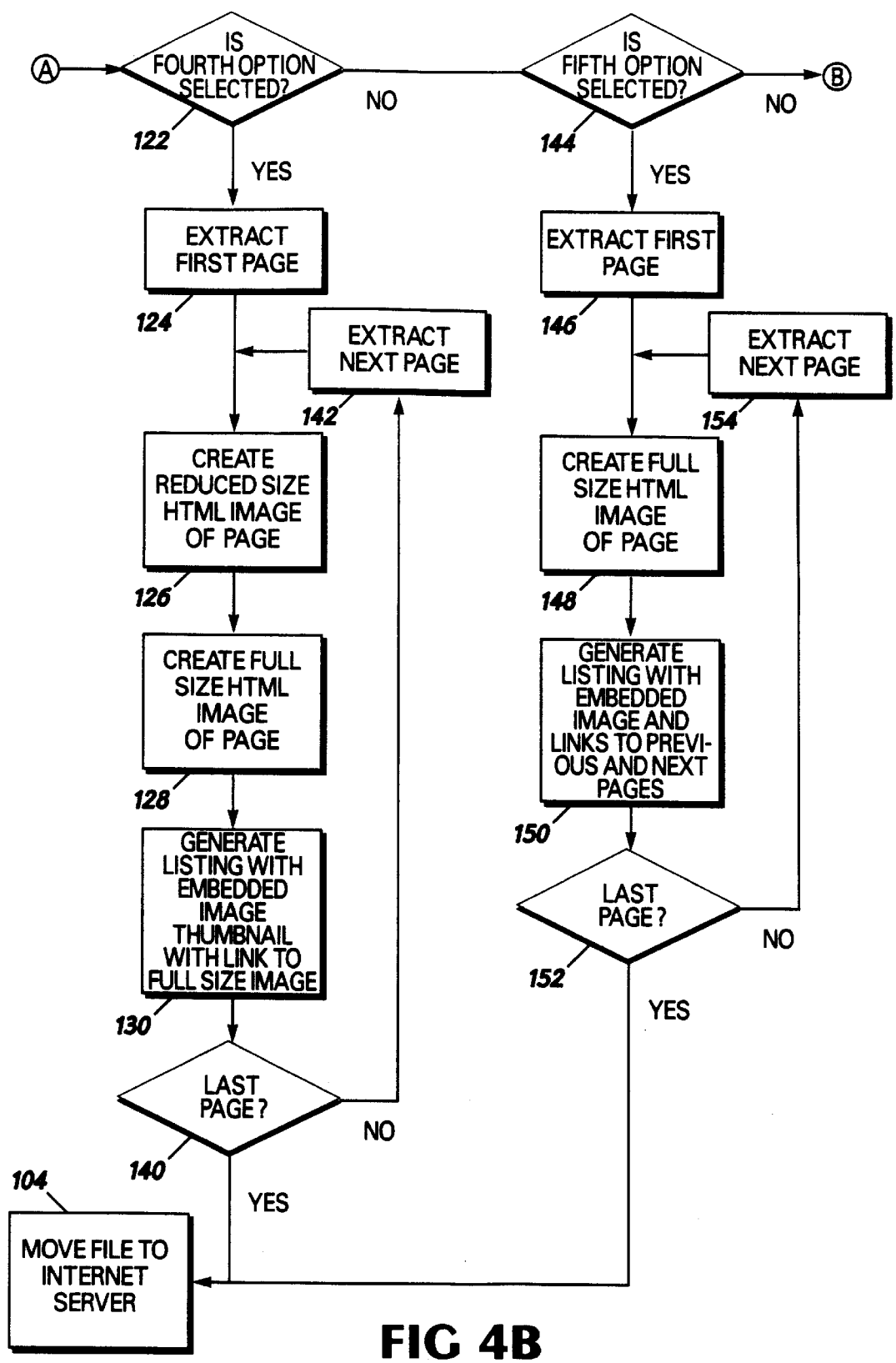

If, at step 122, the fourth option is determined to be selected, then a reduced size image of each page is provided to the user with the option of enlarging the page to view the contents of the page more clearly. With reference to FIG. 4(B), the information necessary for the third option is produced by first extracting the first page of the facsimile message at step 124. A reduced size HTML image is created at step 126 and then a full size HTML image is created at step 128. At step 130, the listing is generated with embedded thumbnail images of the pages with links to the full size images. If the page is not the last page, as determined at step 140, then the next page is extracted at step 142 and steps 126 to 130 are repeated to generate the HTML files for the other pages of the facsimile message. After the last page has been converted into an HTML file according to the third option, the files are moved onto the Internet Server at step 104.

At step 144, the MSDS 10 determines whether the fifth option has been selected. The fifth option provides the user with a full size image of each page of the facsimile message. While only five options have been discussed, the invention may be practiced with additional options. Consequently, with additional options and with the fourth option not being selected, the MSDS 10 would next determine whether one of the additional options have been selected. With the preferred embodiment of the invention having only five options, however, the MSDS 10 will assume that the fifth option has been selected if none of the first four options were found to be selected.

The information necessary to display the pages of the facsimile message according to the fifth option is generated by first extracting the first page of the facsimile message at step 146. At step 148, a full size HTML image of the page is created and, at step 150, a listing is generated with an embedded image and links to previous and next pages. When the page is not the last page, as determined at step 152, the MSDS 10 extracts the next page and generates the HTML file for that page. After all pages have been converted into HTML files according to the fourth option, the files are sent to the Internet Server at step 104.

Figure 5:
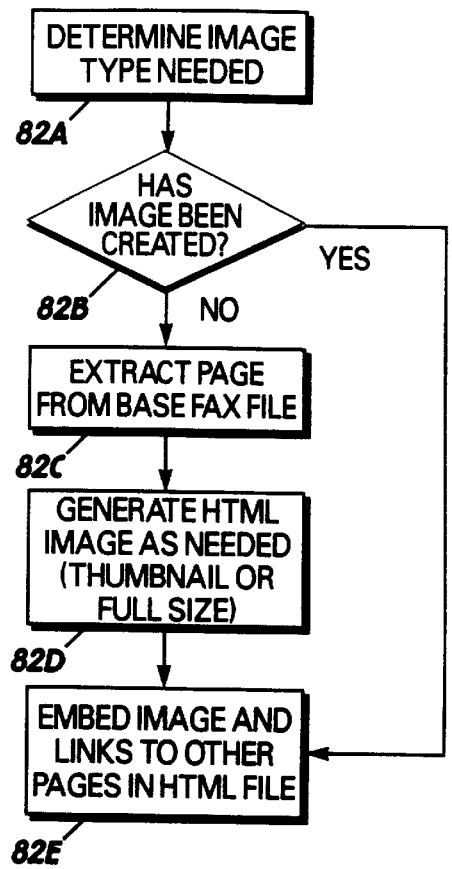
FIG. 5 is a flowchart of operations for generating requested information.

While FIGS. 4(A) and (B) describe the operations of the MSDS 10 at the time a message is received, FIG. 5 depicts an overall flowchart of operations for the MSDS 10 when the user requests a page of information in a display format other than the user's preferred option of displaying the message. FIG. 5 is therefore a more detailed explanation of how the MSDS 10 generates the necessary information at step 82 of FIG. 3.

In general, as shown in FIG. 5, the MSDS 10 first determines the type of image that is needed at step 82a. For example, at this step, the MSDS 10 will determine whether images are unnecessary, whether an image of just the cover page is necessary, whether an image is needed for every page, and whether the image needs to be a full size, a reduced size, or both full and reduced sized images. At step 82b, the MSDS 10 determines whether the image has already been created. If the image has not been created, then at step 82c the MSDS 10 will extract the page from the base facsimile file and, at step 82d, generate the required HTML image. As discussed above, the required image may be for just the cover page, for all the pages, and may be a full size and/or a reduced size image of the page. At step 82e, the image is embedded with links or anchors to other HTML files. These links or anchors might be references to the next and previous pages and also to the next and previous facsimile messages. Finally, the HTML file having the embedded image and links is sent to the user at step 80 in FIG. 3.

The process for converting a facsimile message into HTML files according to the fifth option will be described with reference to FIG. 6. This process will occur at step 54 when the message is received and when the fifth option is the user's preferred option of displaying the messages. It should be understood that a similar type of process will also occur when the user requests a page of information according to the fifth option when the user is retrieving a facsimile message and the fifth option is not the user's preferred option. The conversion processes according to the other options will become apparent to those skilled in the art and will therefore not be discussed in further detail.

Figure 6:
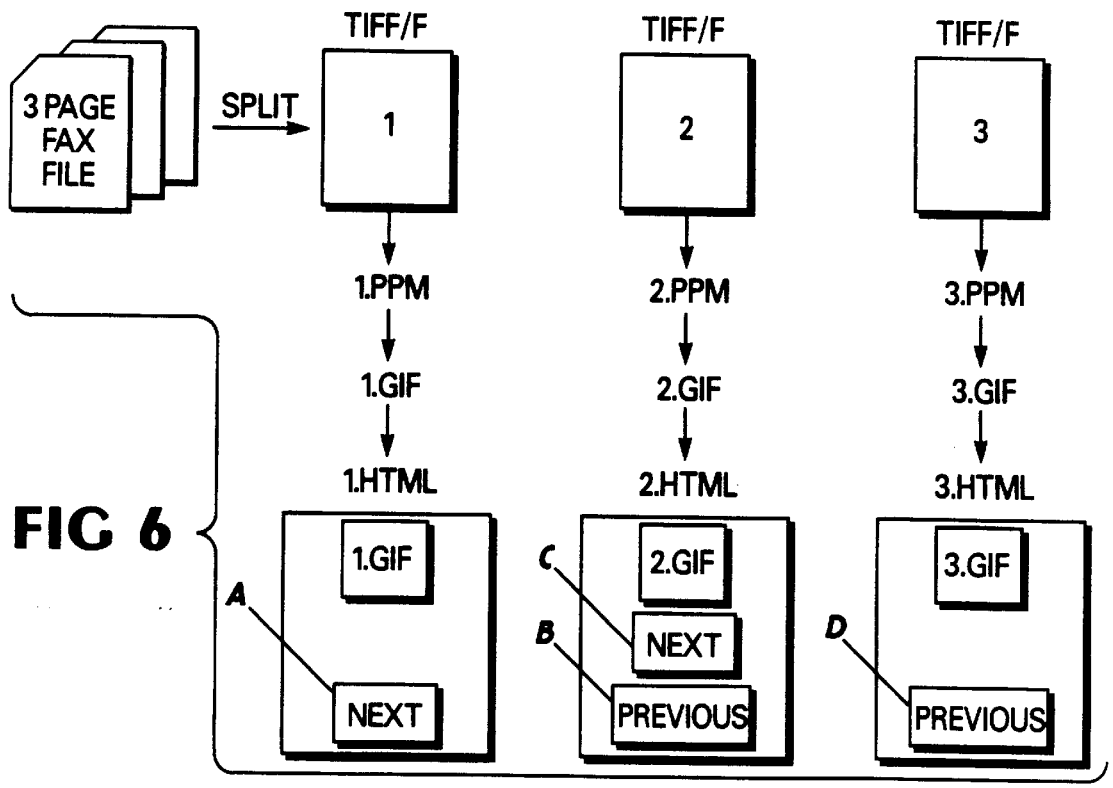
FIG. 6 is a flowchart of operations for converting a facsimile message into HTML files.

With reference to FIG. 6, when the facsimile message is received, the message is in a Tagged Image File Format/Facsimile (TIFF/F) and each page of the facsimile message is split into a separate file. Each page of the facsimile message is then converted from the TIFF/F format into a Portable Pixel Map (PPM) format. The PPM files are next converted into separate Graphic Interchange Format (GIF) files and then into separate HTML files. Thus, each page of the facsimile message is converted into a separate HTML file. The TIFF/F files may be converted into PPM with an available software package entitled "LIBTIFF" and the PPM files may be converted into GIF files with an available software package found in "Portable Pixel Map Tools."

The invention is not limited to this exact conversion process or to the particular software packages used in the conversion process. For instance, the TIFF/F files may be converted into another portable file format, through any other type of intermediate format, or may be converted directly into the GIF format. Further, instead of GIF, the facsimile messages may be converted into JPEG, BMP, PCX, PIF, PNG, or any other suitable type of file format.

The files may be identified with any suitable filename. In the preferred embodiment, the files for each user are stored in a separate directory assigned to just that one user because an entire directory for a given user generally can be protected easier than the individual files. The memory, however, may be organized in other ways with the files for a single user being stored in different directories. The the first part of the filename is a number preferably sequentially determined according to the order in which messages arrive for that user. The preferred naming convention for ending the filenames is depicted in FIG. 6. Each page of the facsimile message is saved as a separate file with an extension defined by the format of the file. Thus, the files will end with an extension of ".TIFF," ".PPM," ".GIF," or ".HTML" according to the format of the particular file. In the example shown, the separate pages have filenames which end with the respective page number, for instance, the first page ends with a "1." The files, however, are preferably terminated with a letter or multiples letters to indicate the order of the pages. For instance, page 1 might have an ending of "aa," page 2 might have an ending of "ab," etc. The invention, however, is not limited to the disclosed naming convention but encompasses other conventions that will be apparent to those skilled in the art.

As shown in FIG. 6, in addition to the GIF files representing the pages of the facsimile message, the HTML files include a number of anchors or references. In the example shown, the first HTML file has an anchor a for the "Next Page." Anchor a is defined as a=<A HREF="2.html">Next Page</a> and will therefore reference the second HTML file when a user selects the "Next Page." The second HTML file has an anchor b for the "Previous Page" and an anchor c for the "Next Page" and the third HTML file has an anchor d for the "Previous Page." With these particular HTML files, the user can scroll through each page of the facsimile message and view a full size image of the page.

Each HTML file preferably contains anchors in addition to those relating to "Next Page" and "Previous Page." For instance, each HTML file may contain an anchor to the next facsimile message, an anchor to the previous facsimile message, and an anchor to return to the facsimile list. The HTML files preferably contain anchors relating to "Save" and "Delete." When the "Save" anchor is selected, the user would be able to save the message under a more descriptive name for the message. The "Delete" anchor is preferably followed by a inquiry as to whether the user is certain that he or she wants to delete the message. Other anchors, such as an anchor to the general listing, will be apparent to those skilled in the art and may also be provided.

Figure 7:
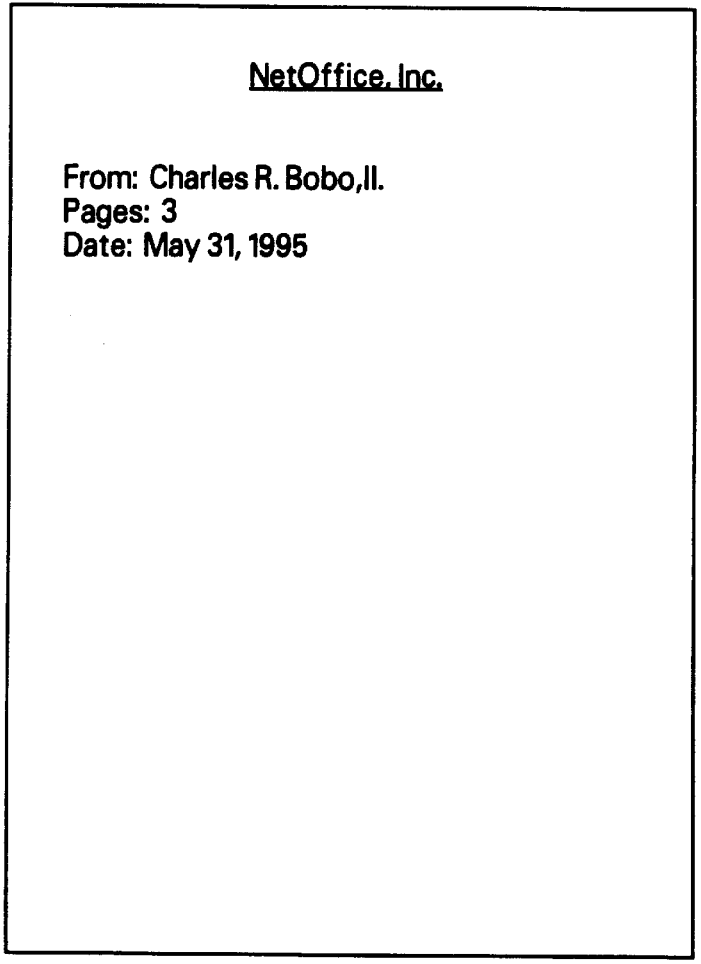
FIG. 7 is an exemplary display of a first page of a facsimile message according to a fourth display option.

FIG. 7 provides an example of a display according to the fifth option for the first page of the facsimile message shown in FIG. 6. The headings of the display provide information on the telephone number from where the message was sent, the date and time the message was received at the MSDS 10, and an indication of the page of the message being displayed. The main portion of the display is the full size image of the page. At the bottom of the display, an anchor or link is provided to the "Next Page" and another anchor is provided to the "Return to Fax Listing." Additional information may also be provided on the display, such as a link to a company operating the MSDS 10.

An example of the "1.html" file for generating the display shown in FIG. 7 is shown below in Table 1.

<HTML>
<HEAD>
<TITLE>Fax Received on May 31, 1995 at 1:58 PM from (404)249 6801; Page 1 of 3</TITLE>
</HEAD>
<BODY>
<H1>Fax from (404)249-6801</H1>
<H2>Received on May 31, 1995 at 1:58 PM</H2>
<H2>Page 1 of3</H2>
<IMG SRC="1.gif">
<P>
<A HREF="2.html">Next Page</a>
<HR>
<A HREF="faxlist.html">Return to Fax Listing</A>
<P>
This page was automatically generated by FaxWeb(tm) on May 31, 1995 at 2:05 PM.
<P>
&copy; 1995 NetOffice, Inc.
<HR>
<Address>
<A HREF="http://www.netoffice.com/">NetOffice, Inc.</A><BR>
PO Box 7115<BR>
Atlanta, Ga. 30357<BR>
<A HREF="mailto:info@netoffice.com">info@netoffice.com</A>
</Address>
</BODY>
</HTML>

TABLE 1

As is apparent from the listing in Table 1, the image file "1.gif" for the first page is embedded into the HTML file "1.html." Also apparent from the listing is that the anchor for "Next Page" directs the MSDS 10 to the second page of the facsimile message having the filename "2.html" and the anchor for "Return to Fax Listing" directs the MSDS 10 to the filename "faxlist.html" containing the list of facsimile messages.

Figure 8:
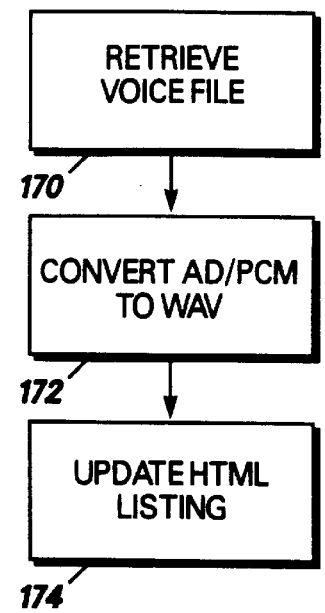
FIG. 8 is a flowchart of operations for converting a voice message into an HTML file.

A process for converting a voice message into an HTML file is illustrated in FIG. 8. The voice message is originally stored in a VOX format or an AD/PCM format and is retrieved at step 170. The voice message is then converted either into an AU format or WAV format in accordance with the user's preference, which is stored in memory. Preferably, the message is preferably in the AD/PCM format originally and is converted in WAV, but the voice files may alternatively be stored and converted in file formats other than the ones disclosed, such as RealAudio (RA).

At step 174, the listing of all of the voice messages is then updated to include a listing of the newly received voice message and an anchor to the voice message. For instance, the original voice message may be stored with filename "1.vox" and is converted into WAV and stored with a filename "1.wav." The HTML file "voicelist.html" which contains a list of all voice messages would then have an anchor to the filename "1.wav" along with identifying information for the voice message, such as when the message was received.

The listing of the voice messages may have additional anchors or references. For instance, each voice message may have an anchor directing the MSDS 10 to a file which contains a short sampling of the message. Thus, when the user selects this anchor, the user could receive the first 5 seconds of the message or some other predefined number of seconds. As with the listing of facsimile messages, the listing of the voice messages also preferably has anchors to "Save" and "Delete."

Figure 9:
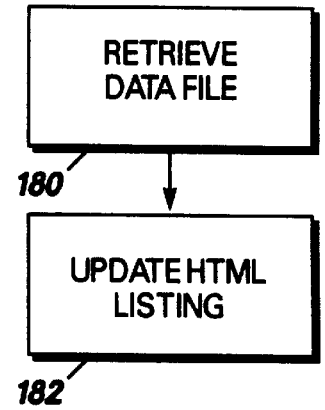
FIG. 9 is a flowchart of operations for converting a data message into an HTML file.

FIG. 9 illustrates a process for converting a data message into HTML. At step 180, the data file is retrieved from a database and at step 182 the HTML file containing the list of data messages is updated to include a listing of the newly received message along with identifying information. For instance, the HTML file for the listing "datalist.html" would be updated to include an anchor to a data file "file 1.1" and would have information such as the time and date that the data was transmitted, the size of the data file, as well as additional identifying information.

Figure 10:
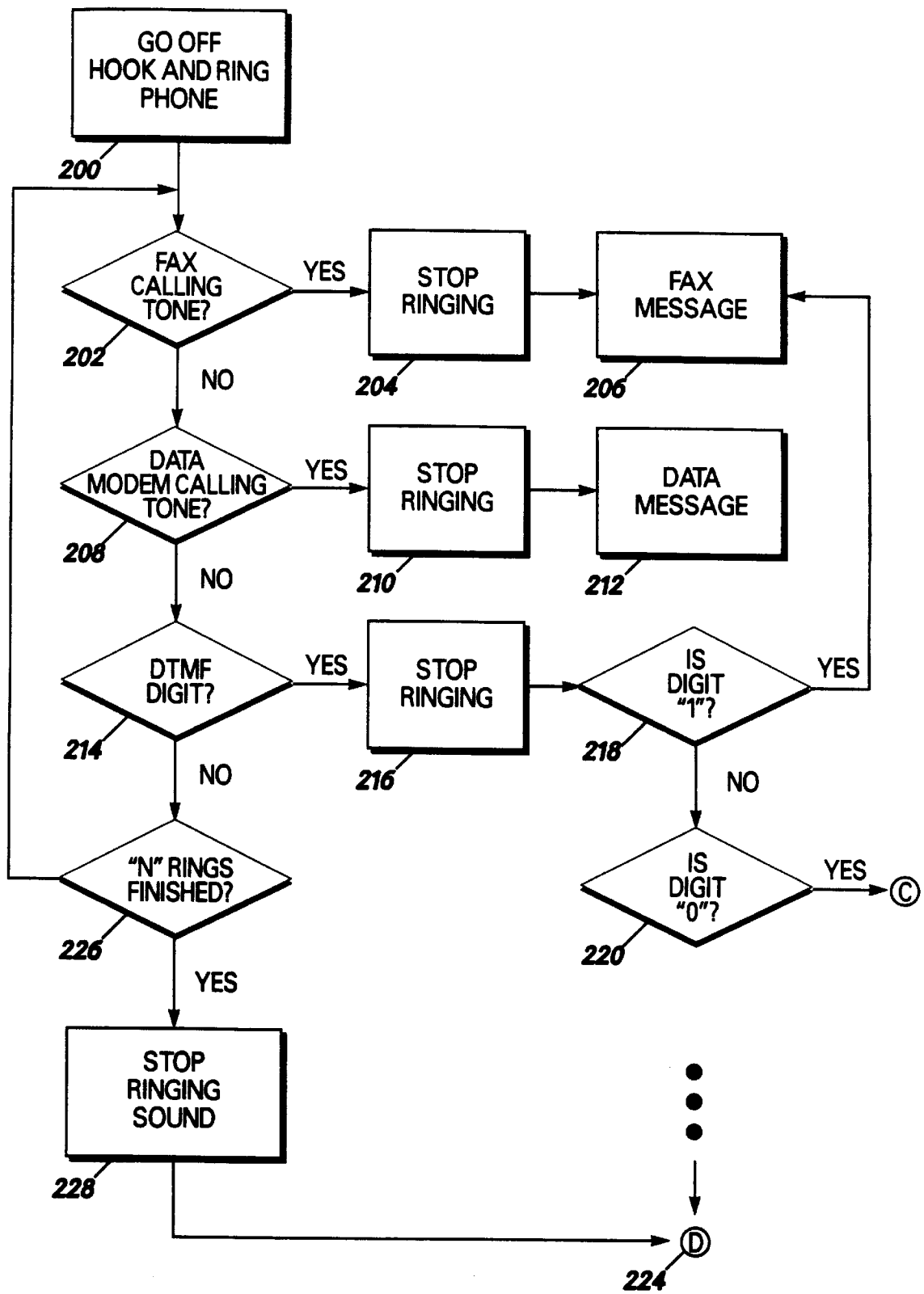
FIG. 10 is a flowchart of operations for detecting a type of call received at the MSDS 10.

Because the MSDS 10 can receive messages of various types, such as a facsimile message, voice message or data message, the MSDS 10 must be able to determine the type of message that is being sent over the DID trunk 15. With reference to FIG. 10, when an incoming call is received, the MSDS 10 goes off hook at step 200 and starts to generate a ringing sound. If, at step 202, a facsimile calling tone is detected, then the ringing sound is stopped at step 204 and the message is received as a facsimile message at step 206. Similarly, when a data modem calling tone is detected at step 208, the ringing sound is stopped at step 210 and the message is identified as a data message at step 212.

If the MSDS 10 detects a DTMF digit at step 214, the ringing sound is stopped at step 216 and the MSDS 10 then determines which digit was pressed. When the digit is a "1," as determined at step 218, the message is identified as a facsimile message. The MSDS 10 will thereafter receive and store the facsimile message in the manner described above with reference to FIG. 2. If the digit is identified as a "0" at step 220, the call is identified as an owner's call and will be processed in a manner that will be described below with reference to FIG. 12. As will be apparent, other digits may cause the MSDS 10 to take additional steps. If any other DTMF digit is pressed, at step 224 the MSDS 10 activates a voice call system, which will be described in more detail below with reference to FIG. 11.

With step 226, the MSDS 10 will enter a loop continuously checking for a facsimile calling tone, a data modem calling tone, or for a DTMF digit. If after n rings none of these tones or digits has been detected, the ringing sound is stopped at step 228 and the voice call system is activated at step 224.

Figure 11:
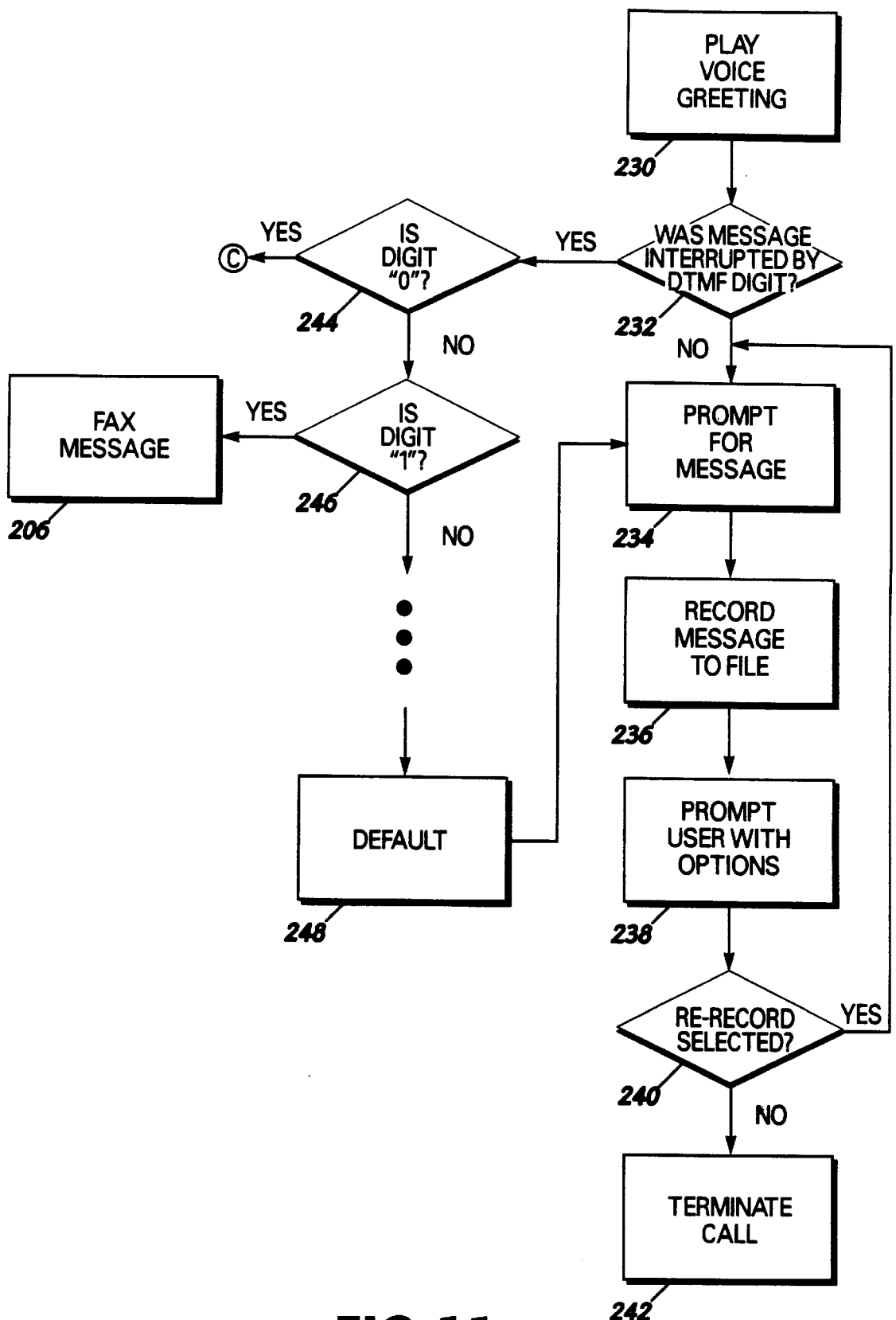
FIG. 11 is a flowchart of operations for receiving voice messages.

With reference to FIG. 11, when a fax calling tone or modem calling tone is not detected, the voice call system begins at step 230 by playing a voice greeting. If the greeting was not interrupted by a DTMF digit as determined at step 232, then the caller is prompted for the voice message at step 234 and, at step 236, the voice message is recorded and stored in memory. At step 238, the caller is prompted with a number of options, such as listening to the message, saving the message, or re-recording the message. Since the selection of these options with DTMF digits will be apparent to those skilled in the art, the details of this subroutine or subroutines will not be described in further detail. When the caller wishes to re-record the message, as determined at step 240, the caller is again prompted for a message at step 234. If the caller does not wish to re-record the message, the call is terminated at step 242.

If the voice greeting is interrupted by a DTMF digit, as determined at step 232, then the MSDS 10 ascertains which digit has been pressed. At step 244, if the digit is a "0," the MSDS 10 detects that the call is an owner's call. When the digit is a "1," the MSDS 10 is informed at step 206 that the call carries a facsimile message. As discussed above with reference to FIG. 10, other DTMF digits may cause the MSDS 10 to take additional steps. If an invalid digit is pressed, by default at step 248 the routine returns to step 234 of prompting the caller for a message.

It should be understood that the invention is not limited to the specific interactive voice response system described with reference to FIG. 11. As discussed above, the invention may be responsive to DTMF digits other than just a "0" and a "1." Further variations or alterations will be apparent to those skilled in the art.

Figure 12:
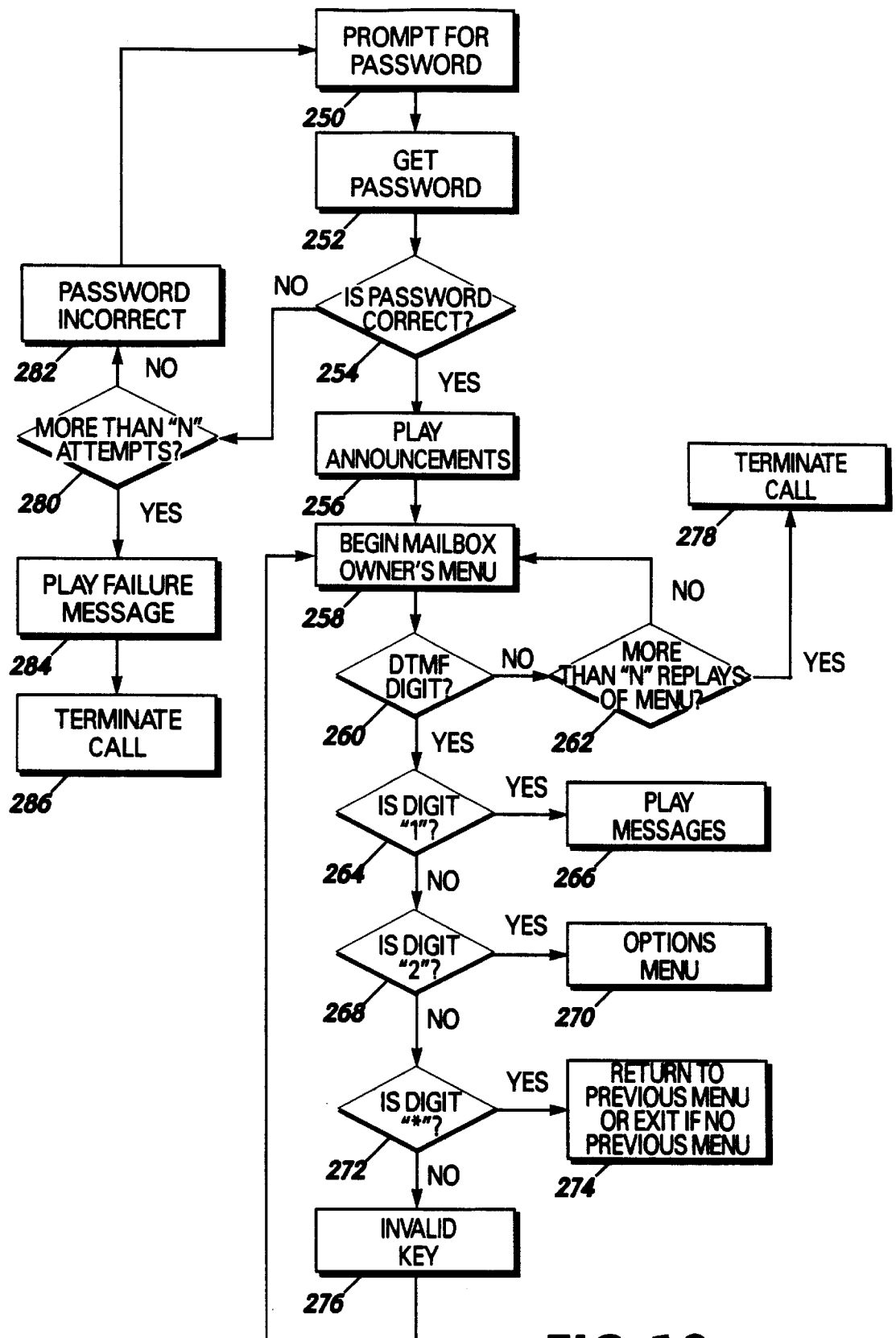
FIG. 12 is a flowchart of operations for interacting with an owner's call.

With reference to FIG. 12, when the call is considered an owner's call, the caller is first prompted for the password at step 250. The password is received at step 252 and, if found correct at step 254, a set of announcements are played to the owner. These announcements would preferably inform the owner of the number of new messages that have been received, the number of saved messages, the number of facsimile message, the number of data messages, and the number of voice messages. Other announcements, of course, could also be made at this time.

At step 258, the owner then receives a recording of the owner's menu with the appropriate DTMF digit for each option. For instance, the DTMF digit "1" may be associated with playing a message, the DTMF digit "2" may be associated with an options menu, and the DTMF digit "*" may be associated with returning to a previous menu or terminating the call if no previous menu exists.

A DTMF digit is detected at step 260 and the appropriate action is taken based upon the digit received. Thus, if the digit is determined to be a "1" at step 264, the owner can play a message at step 266. At step 266, the owner is preferably greeted with a menu giving the owner the options of playing or downloading new messages, saved messages, facsimile messages, data messages, or voice messages. As should be apparent to those skilled in the art, the owner may receive one or more menus at step 266 and the owner may enter one or more DTMF digits in order to play or download a particular message.

If, instead, the digit is determined to be a "2" at step 268, then the owner receives an options menu at step 270. With the options menu, the owner can enter or change certain parameters of the MSDS 10. For instance, the owner can change his or her password, the owner can change the manner in which facsimile messages are displayed on the computer 32, the owner can change the image file format from GIF to another format, the owner can select the file formats for the voice messages, as well as other options.

If the "*" DTMF digit is received, as determined at step 272, then the owner is returned to a previous menu. The "*" digit is also used to terminate the call when the owner has returned to the initial menu. The "*" digit is therefore universally recognized by the MSDS 10 throughout the various menus as a command for returning to a previous menu.

If the owner enters a DTMF digit that is not being used by the MSDS 10, the owner receives an indication at step 276 that the key is invalid and the owner is then again provided with the owner's menu at step 258. When the owner does not enter a DTMF digit while the owner's menu is being played, as determined at step 260, the menu will be replayed n times. Once the menu has been replayed n times, as determined at step 262, then the call will be terminated at step 278.

If the password is incorrect, as determined at step 254, then the MSDS 10 checks whether the user has made more than "n" attempts at step 280. If "n" attempts have not been made, then a password incorrect message will be displayed to the user at step 282 and the user will once again be prompted for the password at step 250. When the user has made "n" attempts to enter the correct password, the MSDS 10 will play a failure message to the user at step 284 and then terminate the call at step 286. The specific number "n" may be three so that the call is terminated after three failed attempts.

The owner's menu may be responsive to an additional number of DTMF digits and may be structured in other ways. For instance, separate DTMF digits may direct the owner to the respective types of messages, such as a facsimile message, data message, or voice message. Also, separate DTMF digits may direct the owner to a recording of new messages or to a recording of saved messages. Other variations will be apparent to those skilled in the art.

Figure 13:
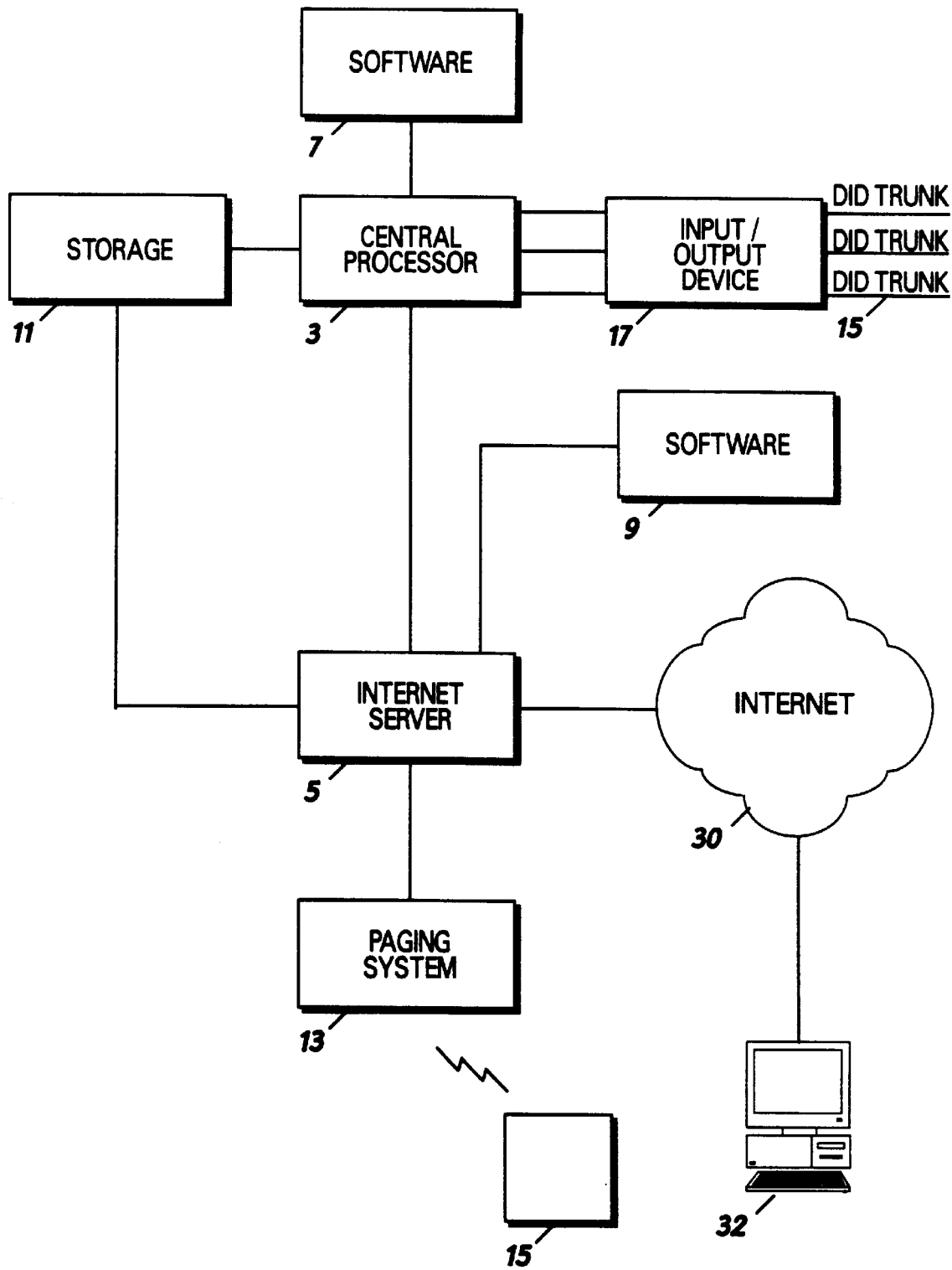
FIG. 13 is a more detailed block diagram of the MSDS 10.

A more detailed diagram of the MSDS 10 is shown in FIG. 13. As shown in the figure, a plurality of DID trunks 15 are received by an input/output device 17 and are then sent to a central processor 3. The number of DID trunks 15 may be changed to any suitable number that would be necessary to accommodate the anticipated number of telephone calls that may be made to the MSDS 10. The input/output device 17 routes a call on one of the DID trunks 15 to an open port of the central processor 3 and is preferably a DID Interface Box manufactured by Exacom.

The central processor 3 receives the calls on the DID trunks 15 and stores the messages in storage 11 in accordance with software 7. Preferably, a separate directory in storage 11 is established for each user having an account on the MSDS 10 so that all of the messages for a single user will be stored in the same directory. It should be understood that the number of processors within the central processor 3 is dependent upon the number of DID trunks 15. With a greater number of DID trunks 15 capable of handling a larger number of telephone calls, the central processor 3 may actually comprise a number of computers. The input/output device 17 would then function to route incoming calls to an available computer within the central processor 3.

Figure 14:
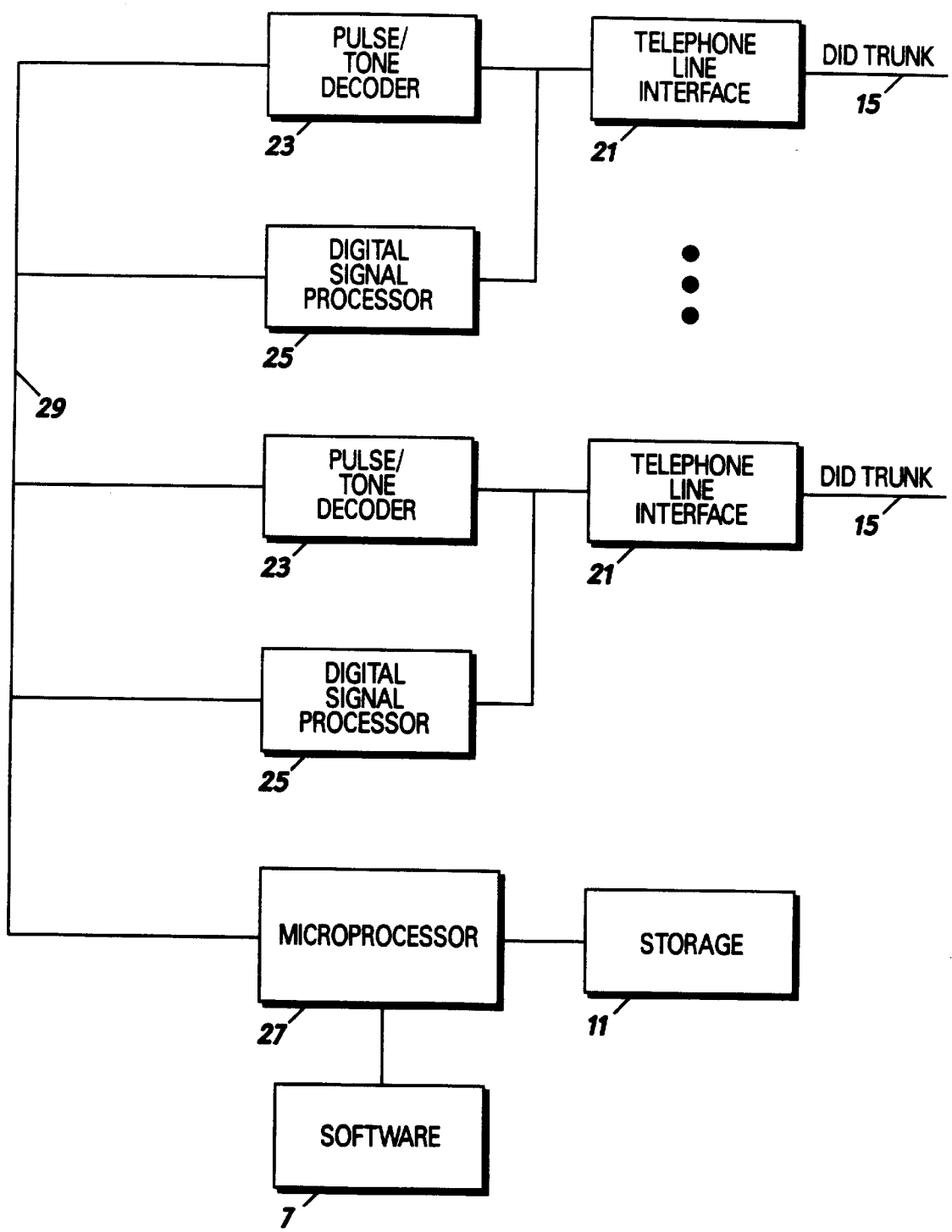
FIG. 14 is a block diagram of the central processor in FIG. 13.

A more detailed diagram of the central processor 3 is shown in FIG. 14. The central processor 3 comprises a telephone line interface 21 for each DID trunk 15. The telephone interface 21 provides the ringing sounds and other communication interfacing with the telephone lines. The signals from the telephone interface 21 are routed to a pulse/tone decoder 23 and to a digital signal processor (DSP) 25. The pulse/tone decoder 23 detects the address signal off of an incoming call and sends the address signal onto a bus 29 to a microprocessor 27. The DSP performs the necessary signal processing on the incoming calls and routes the processed signals to the microprocessor 27.

The microprocessor 27 will then read the address signal from the pulse/tone decoder 23 and store the message from the DSP 25 in an appropriate directory in storage 11. As discussed above, the central processor 3 may comprise a number of computers or, more precisely, a number of microprocessors 27 with each microprocessor 27 handling the calls from a certain number, such as four, DID trunks 15. The microprocessor 27 may comprise any suitable microprocessor, but is preferably at least a 486 PC.

In addition to handling incoming calls and storing the messages in storage 11, the central processor 3 also coordinates the interactive voice response system of the MSDS 10. The software 7 would incorporate the flowcharts of operations for receiving a message shown in FIG. 3, for detecting the type of message on an incoming call shown in FIG. 10, for receiving voice messages shown in FIG. 11, and for receiving an owner's call shown in FIG. 12. Based upon the above-referenced flowcharts and the respective descriptions, the production of the software 7 is within the capability of one of ordinary skill in the art and will not be described in any further detail.

The Internet Server 5 is connected to the central processor 3, such as through a local area network, and also has access to the storage 11. The Internet Server 5 performs a number of functions according to software 9. For instance, the Internet Server 5 retrieves the data files stored in storage 11 by the central computer 3 and converts the files into the appropriate HTML files. The converted HTML files are then stored in storage 11 and may be downloaded to the computer 32 through the Internet 30. The Internet Server 5 also handles the requests from the computer 32, which might require the retrieval of files from the storage 11 and possibly the generation of additional HTML files.

The software 9 for the Internet Server 5 would therefore incorporate the flowchart of operations for generating HTML files according to user preferences shown in FIG. 4, for generating requested information from a user shown in FIG. 5, for converting facsimile messages into HTML shown in FIG. 6, for converting voice messages into HTML shown in FIG. 8, and for converting data messages into HTML shown in FIG. 9. Based upon the above-referenced flowcharts and their respective descriptions, the production of the software 9 is within the capability of one of ordinary skill in the art and need not be described in any further detail.

Figure 15:
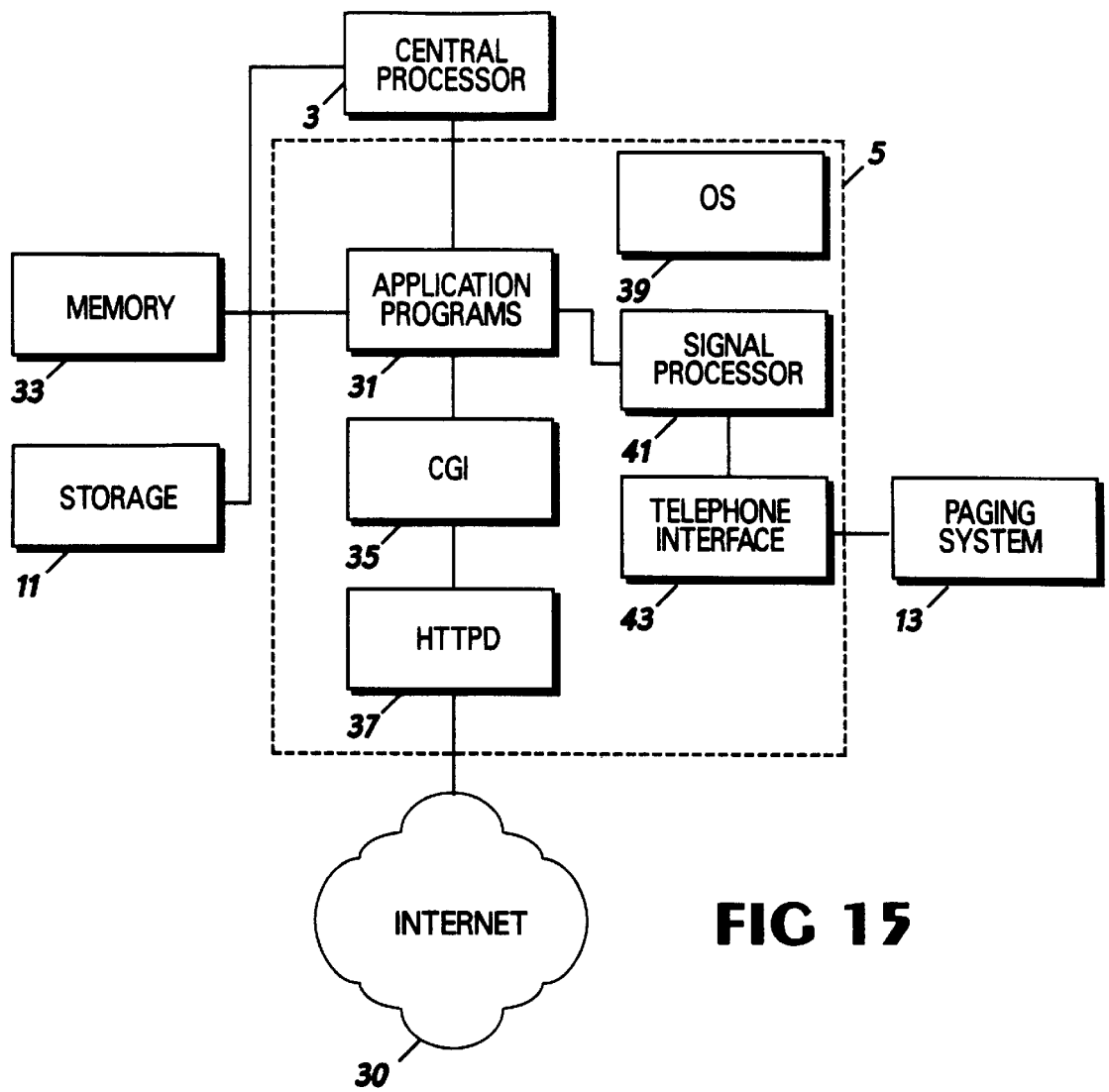
FIG. 15 is a block diagram of the Internet Server of FIG. 13.

Nonetheless, a more detailed block diagram of the Internet Server 5 is shown in FIG. 15. The Internet Server 5 runs on a suitable operating system (OS) 39, which is preferably Windows NT. The Internet Server 5 has a number of application programs 31, such as the ones depicted in the flowcharts discussed above, for communicating with the central processor 3 and for accessing data from storage 11 and also from memory 33.

The memory 33, inter alia, would contain the data indicating the preferences of each user. Thus, for example, when a facsimile message in the TIFF/F format is retrieved by the Internet Server 5, the Internet Server 5 would ascertain from the data in memory 33 the preferred option of displaying the facsimile message and would generate the appropriate HTML files.

All interfacing with the Internet 30 is handled by the HTTPD 37, which, in the preferred embodiment, is "Enterprise Server" from NetScape Communications Corp. Any requests from users, such as a request for a file, would be handled by the HTTPD 37, transferred through the CGI 35, and then received by the application programs 31. The application programs 31 would then take appropriate actions according to the request, such as transferring the requested file through the CGI 35 to the HTTPD 37 and then through the Internet 30 to the user's computer 32.

The Internet Server 5 may be connected to a paging system 13. Upon the arrival of a new message, in addition to sending an E-mail message to the user's mailbox, the Internet Server 13 may also activate the paging system 13 so that a pager 15 would be activated. In this manner, the user could receive almost instantaneous notification that a message has arrived.

The paging system 13 is preferably one that transmits alphanumeric characters so that a message may be relayed to the user's pager 15. The Internet Server 5 therefore comprises a signal processor 41 for generating signals recognized by the paging system 13 and a telephone interface 43. The signal processor 41 preferably receives information from the application programs 31 and generates a paging message in a paging file format, such as XIO/TAP. The telephone interface 43 would include a modem, an automatic dialer, and other suitable components for communicating with the paging system 13.

The information from the application programs 31 may simply notify the user of a message or may provide more detailed information. For instance, with a facsimile message, the information from the application programs 31 may comprise CSI information identifying the sender's telephone number. The user would therefore receive a message on the pager 15 informing the user that a facsimile message was received from a specified telephone number. The amount and type of information that may be sent to the user on the pager 15 may vary according to the capabilities of the paging system 13 and may provide a greater or lesser amount of information than the examples provided.

The Internet Server 5 is not limited to the structure shown in FIG. 15 but may comprise additional components. For instance, the HTTPD 37 would be linked to the Internet 30 through some type of interface, such as a modem or router. The Internet Server 5 may be connected to the Internet 30 through typical phone lines, ISDN lines, a T1 circuit, a T3 circuit, or in other ways with other technologies as will be apparent to those skilled in the art.

Furthermore, the Internet Server 5 need not be connected to the Internet 30 but may be connected to other types of networks. For instance, the Internet Server 5, or more generally the network Server 5, could be connected to a large private network, such as one established for a large corporation. The network Server 5 would operate in the same manner by converting messages into HTML files, receiving requests for information from users on the network, and by transmitting the information to the users.

Also, at least one interface circuit would be located between the Internet Server 5 and the central processor 3 in order to provide communication capabilities between the Internet Server 5 and the central processor 3. This network interface may be provided within both the Internet Server 5 and the central processor 3 or within only one of the Internet Server 5 or central processor 3.

Figure 16A:
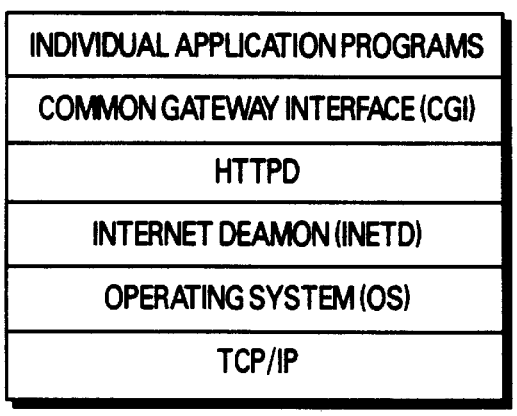
FIGS. 16(A) and 16(B) depict possible software layers for the Internet Server of FIG. 13.
Figure 16B:
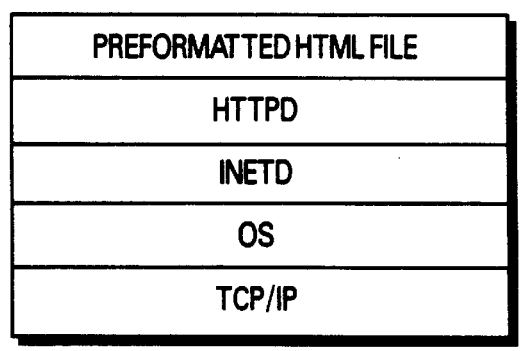

Examples of the Internet Server 5 software layers are shown in FIGS. 16(A) and 16(B), with FIG. 16(A) representing the Internet Server 5 in an asynchronous mode of communication and FIG. 16(B) representing the Internet 5 in a synchronous mode of communication. As shown in the figures, the software 9 for the Internet Server 5 may additional comprise an Internet Deamon for running the HTTPD 37. The software 9 for the Internet Server 5 would also include TCP/IP or other transport layers. Moreover, while the authentication is provided through the HTTPD 37, the authentication of the user's password and ID may be supplemented or replaced with other ways of authentication.

The term synchronous has been used to refer to a mode of operation for the MSDS 10 in which the all possible HTML files for a message are generated at the time the message is received. The HTML files may be generated by the central processor 3 or by the application programs 31. When a request for information is then later received by the HTTPD 37, the information has already been generated and the HTTPD 37 only needs to retrieve the information from storage 11 and transmit the information to the user's computer 32. With a synchronous mode of operation, the CGI 35 would be unnecessary.

The MSDS 10 preferably operates according to an asynchronous mode of operation. In an asynchronous mode of operation, information requested by the user may not be available and may have to be generated after the request. The asynchronous mode of operation is preferred since fewer files are generated, thereby reducing the required amount of storage 11. Because the information requested by a user may not be available, some anchors cannot specify the filename, such as "2.html," but will instead contain a command for the file. For instance, an anchor may be defined as<AHREF="/faxweb/users/2496801/ viewpage.cgi?FAX_NUM=1&PAGE=1&VIEW_MODE=FULL"> for causing the CGI 35 to run a viewpage program so that page 1 of facsimile message 1 will be displayed in a full size image. The CGI 35 will generate the requested information when the information has not been generated, otherwise the CGI 35 will retrieve the information and relay the information to the HTTPD 37 for transmission to the user.

With the invention, the MSDS 10 can reliably receive voice, facsimile, and data messages for a plurality of users and can receive more than one message for a user at a single time. The messages are stored by the MSDS 10 and can be retrieved at the user's convenience at any time by connecting to the Internet 30. The Internet World Wide Web 30 is a constantly expanding network that permits the user to retrieve the messages at virtually any location in the world. Since the user only needs to incur a local charge for connecting to the Internet 30, the user can retrieve or review messages at a relatively low cost.

Even for the user's at the office or at home, the MSDS 10 provides a great number of benefits. The user would not need a facsimile machine, voice mail system, or a machine dedicated for receiving data messages. The user also need not worry about losing part of the message or violating the confidential nature of the messages. The user, of course, can still have a facsimile machine and dedicated computer for data messages. The MSDS 10, however, will permit the user to use the telephone company's "call forwarding" feature so that messages may be transferred to the MSDS 10 at the user's convenience, such as when the user is away from the office.

The software 7 and software 9 are not limited to the exact forms of the flowcharts shown but may be varied to suit the particular hardware embodied by the invention. The software may comprise additional processes not shown or may combine one or more of the processes shown into a single process. Further, the software 7 and 9 may be executed by a single computer, such as a Silicon Graphics Workstation, or may be executed by a larger number of computers.

The facsimile messages preferably undergo signal processing so that the images of the facsimile messages are converted from a two tone black or white image into an image with a varying gray scale. As is known in the art, a gray scale image of a facsimile message provides a better image than simply a black or white image of the message. The signal processing may comprise any suitable standard contrast curve method of processing, such as anti-aliasing or a smoothing filter. The signal processing may occur concurrently with the conversion from TIFF/F to GIF and is preferably performed for both full and reduced size images of the facsimile messages.

Furthermore, the user may be provided with a greater or fewer number of options in displaying or retrieving messages. The options are not limited to the exact forms provided but may permit the user to review or retrieve the messages in other formats. The options may also permit a user to join two or messages into a single message, to delete portions of a message, or to otherwise the contents of the messages. Also, the various menus provided to the user over the telephone may have a greater number of options and the MSDS 10 may accept responses that involve more than just a single DTMF digit.

The specific DTMF digits disclosed in the various menus are only examples and, as will be apparent to those skilled in the art, other digits may be used in their place. For instance, a "9" may be used in the place of a "*" in order to exit the menu or to return to a previous menu. Also, the DTMF digits may be changed in accordance with the user's personal convention. If the user had a previous voice mail system, the user could customize the commands to correspond with the commands used in the previous system in order to provide a smooth transition to the MSDS 10.

The MSDS 10 may restrict a user to only certain types of messages. For instance, a user may want the MSDS 10 to store only facsimile messages in order to reduce costs of using the MSDS 10. In such a situation, the MSDS 10 would perform an additional step of checking that the type of message received for a user is a type of message that the MSDS 10 is authorized to receive on the user's behalf. When the message is an unauthorized type of message, the MSDS 10 may ignore the message entirely or the MSDS 10 may inform the user that someone attempted to send a message to the MSDS 10.

Moreover, the MSDS 10 has been described as having the central processor 3 for handling incoming calls and the Internet Server 10 for interfacing with the Internet 30. The invention may be practiced in various ways other than with two separate processors. For instance, the central processor 3 and the Internet Server 5 may comprise a single computer or workstation for handling the incoming calls and for interfacing with the Internet 30. The MSDS 10 may convert the messages into HTML files prior to storing the messages. Also, the central processor 3 may communicate with the paging system 13 instead of the Internet Server 5.

Additionally, as discussed above, the central processor 3 may comprise a number of microprocessors 27 for handling a large number of DID trunks.

The invention has been described as converting the messages into HTML and transmitting the HTML files over the Internet 30 to the computer 32. The HTML format, however, is only the currently preferred format for exchanging information on the Internet 30 and is actually only one type of a Standard Generalized Mark-Up Language. The invention is therefore not limited to the HTML format but may be practiced with any type of mixed media page layout language that can be used to exchange information on the Internet 30.

SGML is not limited to any specific standard but encompasses numerous dialects and variations in languages. One example of an SGML dialect is virtual reality mark-up language (VRML) which is used to deliver three dimensional images through the Internet. As another example, the computer 32 for accessing the MSDS 10 through the Internet 30 may comprise a handheld device. A handheld device is generally characterized by a small display size, limited input capabilities, limited bandwidth, and limited resources, such as limited amount of memory, processing power, or permanent storage. In view of these limited capabilities, a handheld device markup language (HDML) has been proposed to provide easy access to the Internet 30 for handheld devices. The SGML information transmitted by the MSDS 10 to the computer 32 may therefore comprise HDML information suitable for a handheld device or may comprise VRML.

As another example, Extensible Mark-Up Language (XML) is an abbreviated version of SGML, which makes it easier to define document types and makes it easier for programmers to write programs to handle them. XML omits some more complex and some less-used parts of the standard SGML in return for the benefits of being easier to write applications for, easier to understand, and more suited to delivery and inter-operability over the Web. Because XML is nonetheless a dialect of SGML, the MSDS 10 therefore encompasses the translation of facsimile, voice, and data messages into XML, including all of its dialects and variations, and the delivery of these messages to computers 32 through the Internet 30.

As a further example, the MSDS 10 encompasses the use of "dynamic HTML." "Dynamic HTML" is a term that has been used to describe the combination of HTML, style sheets, and scripts that allows documents to be animated. The Document Object Model (DOM) is a platform-neutral and language neutral interface allowing dynamic access and updating of content, structure, and style of documents. The MSDS 10 may therefore include the use of the DOM and dynamic HTML to deliver dynamic content to the computer 32 through the Internet 30.

The MSDS 10 is also not limited to any particular version or standard of HTTP and thus not to any particular hyper-text transfer protocol deamon 37. In general, HTTP is a data access protocol run over TCP and is the basis of the World Wide Web. HTTP began as a generic request-response protocol, designed to accommodate a variety of applications ranging from document exchange and management to searching and forms processing. Through the development of HTTP, the request for extensions and new features to HTTP has exploded; such extensions range from caching, distributed authoring and content negotiation to various remote procedure call mechanisms. By not having a modularized architecture, the price of new features has been an overly complex and incomprehensible protocol. For instance, a Protocol Extension Protocol (PEP) is an extension mechanism for HTTP designed to address the tension between private agreement and public specification and to accommodate extension of HTTP clients and servers by software components. Multiplexing Protocol (MUX) is another extension that introduces asynchronous messaging support at a layer below HTTP. As a result of these drawbacks of HTTP, a new version of HTTP, namely HTTP-NG, has been proposed and its purpose is to provide a new architecture for the HTTP protocol based on a simple, extensible distributed object-oriented model. HTTP-NG, for instance, provides support for commercial transactions including enhanced security and support for on-line payments. Another version of HTTP, namely S-HTTP, provides secure messaging. The MSDS 10 and the HTTPD 37 may incorporate these versions or other versions of HTTP.

In addition to different versions of HTTP, the HTTPD 37 of the MSDS 10 may operate with other implementations of HTTP. For instance, the W3C's has an implementation of HTTP called "Jigsaw." Jigsaw is an HTTP server entirely written in Java and provides benefits in terms of portability, extensibility, and efficiency. The MSDS 10 may employ Jigsaw or other implementations of HTTP.

With regard to the transmission of messages to the user's computer 32, the MSDS 10 permits the user to sample the voice message or to preview the facsimile message without requiring the MSDS 10 to transmit the entire message to the computer 32. This sampling ability is a significant benefit since the transmission of the entire message would frequently tie up the computer 32 for a rather long period of time. Thus, with the preview or sample feature, the user can determine whether the user needs the message transmitted to the computer 32.

If the user does decide that the entire message needs to be transmitted, as stated above, the user's computer 32 might be receiving the message for a relatively long period of time. After the entire message has been received, the user then has the options of viewing, listening, retrieving, or saving the message. As an alternative, the user's computer may instead indicate the contents of the message to the user as the message is being received.

For instance, with a voice message, the user's computer 32 could send the message to an audio speaker as the message is being received. In this manner, the message would be played in real time and the user would not need to wait until the entire message is received before listening to the message. In order to play the messages in real time, the messages are preferably in the RealAudio (RA) format, which the user can select as the preferred file format for voice messages.

In operation, the MSDS 10 would transmit an HTML file containing an RA file. If the user selects the RA file with the browser on the computer 32, the browser will activate a program for use with RA files. The operations and functioning of this program will be apparent to those skilled in the art and will be available as a separate software package or will be incorporated within a browser program. The RA program will request the RA data file containing the message from the MSDS 10 and, as the RA file is being received at the computer 32, this program will play the message in real time.

The MSDS 10 and the user's computer 32 could also be arranged so that each page or even line of a facsimile message could be displayed as the computer 32 receives the facsimile message. Further, although the transmission of a data message is relatively fast in comparison to a voice or facsimile message, the computer 32 could also be programmed to permit access to the data message as the message is being received.

The invention has been described as storing and transmitting voice messages. It should be understood that the voice message would probably be the most often type of audio message stored at the MSDS 10. The invention, however, may be used with any type of audio message and is in no way limited to just voice messages.

According to another aspect of the invention, the MSDS 10 may be used as a file repository serving as an archive for a particular user or group of users. As described above, the MSDS 10 may maintain a list of all messages for a particular user which is displayed to the user when the user access his or her mailbox. The MSDS 10 may store all messages, whether they are voice, facsimile, or data, for a user in the database indefinitely. The MSDS 10 may therefore be relied upon by a user to establish the authenticity of a message and the existence or absence of a particular message. Through the MSDS 10, a user can therefore maintain an accurate record of all received email messages, facsimile messages, and data transfers.

In addition to serving as a file depository, the MSDS 10 may also function as a document management tool. As described above with reference to FIG. 2, when the MSDS 10 receives a message, the MSDS 10 updates a database with information on the message. This information includes the type of message, whether it is a facsimile message, voice message, or data message, the time and date at which the message was received, the size of the file, such as in bytes, the telephone number of the caller leaving the message, as well as other information, such as the number of pages of a facsimile message. Because the telephone number called is unique for each user, the information also includes the intended recipient of the message.

Figure 17:
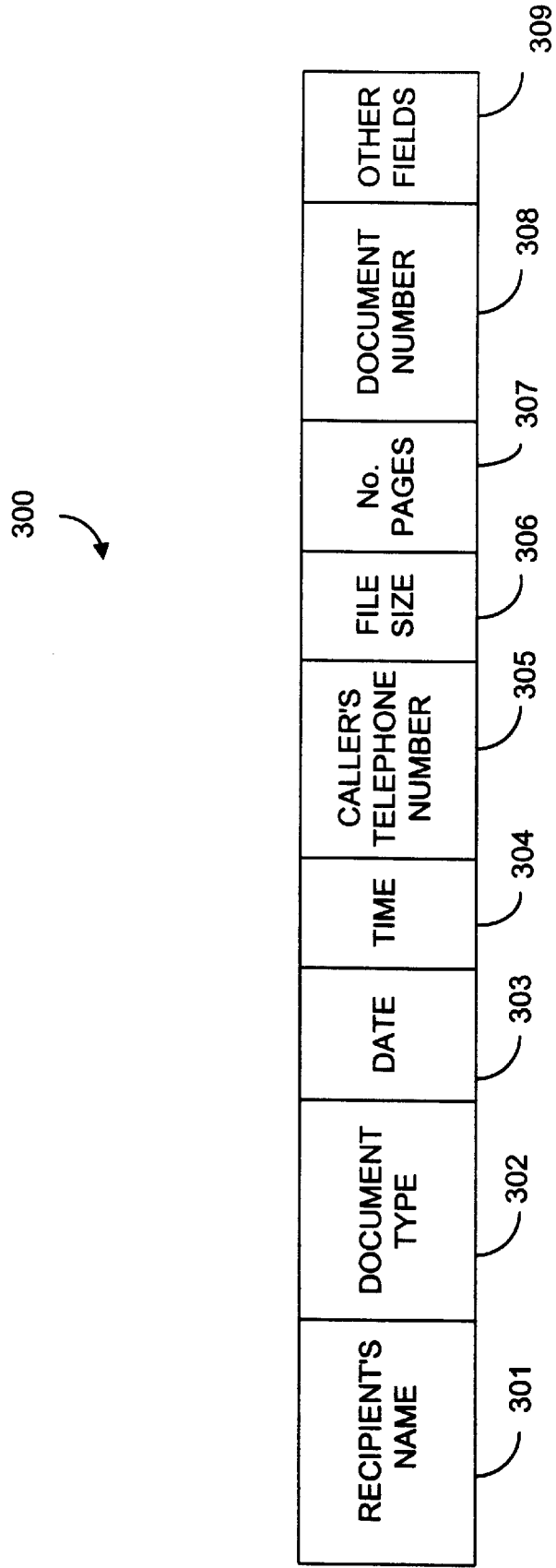
FIG. 17 is a diagram of a data entry for a message signal.

An example of a data entry 300 in storage 11 for a message is shown in FIG. 17. The data entry 300 represents the entry for just a single message with each message having a separate data entry 300. Preferably, the data entries 300 are stored in a relational database and may be searched through a structured query language (SQL).

As shown in FIG. 17, the data field 300 for a message may comprise numerous data fields for describing the message. One of these data fields may comprise a field 301 for indicating the name of the person receiving the message. As will be appreciated by those skilled in the art, the person may be identified in numerous ways, such as by a portion of the person's name or by a unique number. Another field 302 in the data entry 300 indicates the type of the document, such as whether the document is a facsimile message, voice message, or data transfer, and fields 303 and 304 respectively indicate the date and time that the message was received by the MSDS 10. The telephone number of the caller is indicated in field 305 while the size of the message, which may be measured in bytes, is indicated in field 306 and the number of pages of the message is indicated in field 307. A document number for uniquely identifying the message is indicated in field 308. As discussed above, the files or messages received for a particular user may be numbered sequentially in the order that they are received by the MSDS 10. The files and messages, however, may be numbered or identified in other ways, such as by a combination of numbers with an identifier for the date when the message was received. Also, the documents number or identifier may be unique for each file or message directed to a user or, alternatively, may be unique for each file or message directed to a plurality of users, which is advantageous when the MSDS 10 tracks documents for an entire company or other group of users.

In addition to fields 301 to 308, the data entry 300 for a message or file may have other fields 309 for describing or documenting the message or file. The other fields 309, for instance, may be used to identify the type of storage that a message should receive. The messages or files may have different lengths of time that the message is stored before being automatically deleted. The type of storage, such as whether the full text of the message is stored, may also be indicated by field 309. Another example of a trait that may be contained within the other field 309 is security. At times, a user may desire and may be granted access to another person's mailbox, such when the MSDS 10 tracks documents for an entire company. By designating a message or file as secure in field 309, a user may restrict or deny access to that message or file by other users. The other fields 309 may also be used by a user to customize the MSDS 10 according to his or her own desires. For instance, if the user is a company, the company may want to classify messages according to the division at which the message is directed, such as one code for marketing, one for sales, one for engineering, and one for legal.

As another example of a use of one of the other fields 309, a user can input notes in the other field 309. When a user initially receives a data entry 300, the entry 300, for instance, may include data in all fields 301 to 308 except field 309, which has been left blank. The user can then input his or her notes in the other field. An initial data entry 300 may include the field 305 for the caller's telephone number which contains the digits for the calling number. The user, however, may not readily recognize the caller from just reading the telephone number listed in field 305. To more clearly indicate the caller, the user may input notes in field 309 to identify the caller's name. Alternatively, the notes in field 309 may reflect part or all of the contents of the message. The user may receive a large document or message and may input a brief description of the document or message in the field 309. As another example, the recipient of the message may read the message or document and discover that the caller is requesting some service or goods from the recipient, such as a request for certain documents or delivery of a certain quantity of goods. The recipient may read the document or message and place somes notes in the field 309 to indicate the type of follow-up service or action that needs to be taken. An assistant to the recipient can then view the notes in field 309 and take appropriate steps to ensure that the requested service or goods are delivered. If the data entry is security protected, one of the other fields 309, as discussed above, may grant the assistant limited access to just the field 309 or may grant more expansive access whereby the assistant can view fields 301 to 309 as well as the actual document or message. The fields 309 may serve various other purposes, as will be apparent to those skilled in the art.

Figure 18:
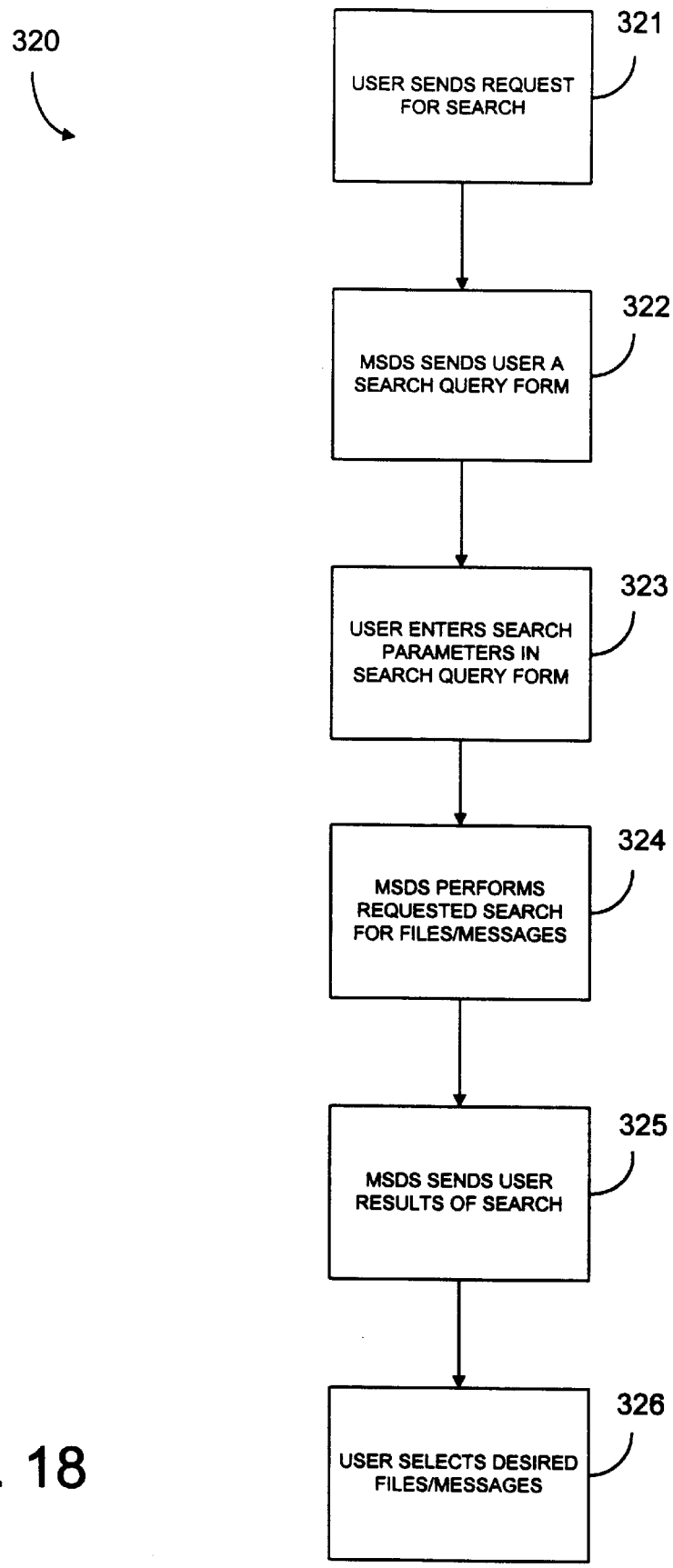
FIG. 18 is a flowchart of a process for sending a search query, for conducting a search, and for returning results of the search to a computer through the Internet.

FIG. 18 illustrates a process 320 for using the MSDS 10 for document management purposes. With reference to FIG. 18, a user sends a search request to the MSDS 10 for a particular document or set of documents at step 321. The user may issue this request with the computer 32 by clicking on a link, such as a link to "Search Documents," which may be presented to the user by the MSDS 10 after the user has been granted accesses to his or her mailbox at step 72 shown in FIG. 3. The MSDS 10 may present the user with the option to search the document archives at other times, such as when the user first attempts to access the mailbox at step 62, or when the URL received by the HTTPD 37 from computer 32 points toward the document archives.

In response to this request, the HTTPD 37 sends the user a search query form at step 322 to allow the user to define a desired search. An example of a search query form is shown in FIG. 19. The search query form may include an entry for each of the data fields 301 to 309 in the data entry 300. For instance, the user may input one or more names for a recipient and have the MSDS 10 search for all messages or files directed to just those recipients. The user may also indicate the type of document, such as whether it is a facsimile, voice message or data file. The search query form also has entries for the date or time, which preferably accept ranges of times and dates, and an entry for the telephone number of the caller to the MSDS 10. The search query form may also include an entry for the size of the file or for the number of pages, which is relevant if the message is a facsimile message. The search query form may also include an entry for the document number, which may accept a range of document numbers, and also an entry for another field.

At step 323, the user enters the search parameters in the search query form with computer 32 and returns the information to the MSDS 10 through the Internet 30. The user may define the search about any one data field or may define the search about a combination of two or more data fields. For instance, as reflected in the completed search query form shown in FIG. 20, a user may define a search by designating the document type as a facsimile and the calling number as (404) 249-6801. Once the user has finished defining the search, the user then selects the "SEARCH" link shown at the bottom of the screen whereby the user's computer 32 would send the completed search query form through the Internet 30 to the HTTPD 37 of the MSDS 10.

At step 324, the HTTPD 37 receives the completed search query form and, through CGI 35, invokes one or more of the application programs 31 for performing the desired search for any files or messages falling within the parameters of the search. The results of the search are passed from the application programs 31 through the CGI 35 to the HTTPD 37 and, at step 325, are returned to the user through the Internet 37. Preferably, the MSDS 10 returns the search results in the form of a listing of all files or messages contained within the search parameters, although the MSDS 10 may return the results in other ways.

Figure 20:
FIG. 20 is an example of a completed search query.
Figure 20:
Figure 20:

An example of the search results of the query shown in FIG. 20 is shown in FIG. 21. As discussed above, the parameters of the search were all facsimile messages from telephone number (404) 249-6081. With reference to FIG. 21, this query resulted in three messages being discovered. The first document has a document number 11 and is described as being a facsimile from the designated telephone number to Jane Doe on May 31, 1995, and consists of three pages. This first-listed document is an example of the facsimile shown in FIG. 7. The other two documents respectively correspond to document numbers 243 and 1,002 and are also from the designated telephone number.

At step 326, the user selects the desired file or message from the listing of messages and files. For instance, by clicking on the first listed document, namely document number 11, the computer 32 sends a request to the MSDS 10 for a viewing of that document and, in response, the MSDS 10 provides a viewing of the document according to the user defined preferences. As described above, the user may receive a reduced size image of the first page, a full size image of the first page, reduced size images of all pages, or full size images of all pages of the facsimile message. Thus, if the user selected the fourth display option as the user defined preference, the MSDS 10 would return an image of the first page of the facsimile, such as the one depicted in FIG. 7.

At step 326, the user may also have the MSDS 10 save the search results. For instance, as shown in FIG. 21, the user may input the name of "CHARLES R. BOBO FACSIMILES" as the name for the search. By clicking on the "SAVE SEARCH AS" link, the name of the search is provided from the computer 32 to the MSDS 10. At the MSDS 10, the HTTPD 37 transfers the information from the computer 32 to the CGI 35 and the CGI 35 invokes an application program 31 to store the results of the search in storage 11 under the designated name. The invoked application program 31 preferably does not store the contents of all messages but rather stores a listing of the search results in the storage 11.

The results of a search may be stored in storage 11 as either a closed search or an open search. If the MSDS 10 saves the results of a search as an open search, then the files or messages in that named search may be updated with recent files or messages falling within the particular search parameters for the search. On the other hand, a closed search is one in which the files or messages in the named search are limited to those existing at the time of the search. For example, if the MSDS 10 saved the search results shown in FIG. 21 as a closed search, then any retrieval of the "CHARLES R. BOBO FACSIMILES" would result in only the three listed documents. If, on the other hand, the search named as the "CHARLES R. BOBO FACSIMILES" was saved by the MSDS 10 as an open search, then the MSDS 10 would reactivate the search query shown in FIG. 20 in response to a request by the computer 32 for that search in order to obtain all facsimile messages from that particular telephone number, including those received after the initial saving of the search results.

With reference to FIG. 19, rather than defining a new search, the user may click on the "STORED SEARCHES" link in order to receive the results of a previously performed search. For example, by clicking on this link, the MSDS 10 may return a listing of searches stored for that particular user, such as the searches shown in FIG. 22. As shown in this figure, the "CHARLES R. BOBO FACSIMILES" is included within the list of stored searches. If the user then selected the "CHARLES R. BOBO FACSIMILES" search, the user may then be presented with the listing of facsimiles shown in FIG. 21, possibly including recent additions to the search group.

With reference to FIG. 19, the MSDS 10 may also provide a user with a link to "RECENT FILES" at step 322. By selecting this link, the MSDS 10 may return a listing of all facsimile, voice, and data messages received with a particular period of time, such as the last month. By placing the "RECENT FILES" link on the search query form rather than in the listing of "STORED SEARCHES," the user can quickly turn to the most recent files and messages. The search query form may contain other such easy-access links, such as a link to the last search performed by the MSDS 10 on behalf of the user.

The messages or files received by the MSDS 10 need not arrive from a third party. In other words, the MSDS 10 may be used as a file repository or as a file manager for documents generated by the user itself. The user may call the designated telephone number for receiving messages and transmit voice messages, data messages, or facsimile messages and have the MSDS 10 document the receipt and content of these messages. A user may easily use a facsimile machine as a scanner for entering documents into the storage 11 of the MSDS 10.

The MSDS 10 may have applications in addition to those discussed-above with regard to serving as a message deliverer, file repository, and file manager. For instance, the MSDS 10 may perform some additional processing on the incoming calls prior to forwarding them to the user. For voice messages, this processing may involve transcribing the message and then returning the transcribed messages to the user. The MSDS 10 may therefore be viewed as offering secretarial assistance which may be invaluable to small companies or individuals who cannot afford a secretary or even to larger businesses who may need some over-flow assistance. The transcription may be provided by individuals located in any part of the world or may be performed automatically by a speech-to-text recognition software, such as VoiceType from IBM.

Another type of processing that the MSDS 10 may provide is translation services. The incoming call, whether it is a voice, facsimile, or data message, can be converted into SGML and then forwarded first to a translator. Given the reach of the Internet, the translator may be located virtually anywhere in the world and can return the translated document via the Internet to the MSDS 10. The MSDS 10 can notify the user that the translation has been completed through email, voice mail, pager, facsimile, or in other ways. The user would then connect to the Internet and retrieve the translated document. The translation services of the MSDS 10 may also provide transcription of the message, such as with speech-to-text recognition software.

The foregoing description of the preferred embodiments of the invention have been presented only for the purposes of illustration and description. It is not intended to be exhaustive or to limit the invention to the precise form disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. It is intended that the scope of the invention only be limited by the claims appended hereto.

I claim:

1. A network message storage and delivery system, comprising:

means for receiving an incoming call and for detecting an address signal associated with said incoming call, said address signal associated with a user of said message storage and delivery system;

means for receiving a message accompanied with said address signal, said message being in a first file format;

means for converting said message from said first file format to a second file format;

means for storing said message in said second file format in a storage area;

means for receiving a request from said user for said message and for retrieving said message from said storage area; and means for transmitting a least a portion of said message in said second file format to said user over a transmission link;

wherein said portion of said message is transmitted to said user over the network, said second file format is a mixed media page layout language and comprises a standard generalized mark-up language.

2. A network message storage and delivery system, comprising:

means for receiving an incoming call and for detecting an address signal associated with said incoming call, said address signal associated with a user of said message storage and delivery system;

means for receiving a message accompanied with said address signal, said message being in a first file format;

means for converting said message from said first file format to a second file format;

means for storing said message in said second file format in a storage area;

means for receiving a request from said user for said message and for retrieving said message from said storage area; and means for transmitting a least a portion of said message in said second file format to said user over a transmission link;

wherein said portion of said message is transmitted to said user over the network, said second file format is a mixed media page layout language, and said network comprises the Internet.

3. A network message storage and delivery system, comprising:

a central processor for receiving an incoming call, for detecting an address signal on said incoming call, for detecting a message on said incoming call, and for placing said message in a storage area, said address signal being associated with a user of said network message storage and delivery system;

a network server for receiving said message from said storage area, for converting said message into a mixed media page layout language, and for placing said message in said storage area;

wherein when said network server receives a request from said user over said network, said network server transmits at least a portion of said message over said network to said user over a transmission link and wherein said network comprises the Internet and said network server comprises an Internet server.

4. A method of storing and delivering a message for a user, comprising the steps of:

receiving an incoming call and detecting an address signal associated with said incoming call, said address signal associated with a user;

receiving a message associated with said address signal, said message being in a first file format;

converting said message from said first file format to a second file format;

storing said message in said second file format in a storage area;

receiving a request from said user for said message and retrieving said message from said storage area; and transmitting at least a portion of said message in said second file format to said user over a transmission link;

wherein said step of transmitting occurs over a network, said step of converting said message converts said message into a mixed media page layout language, and said step of transmitting occurs over the Internet.

* * * * *